US012353410B2

(12) United States Patent
Roy et al.

(10) Patent No.: US 12,353,410 B2
(45) Date of Patent: Jul. 8, 2025

(54) PREDICTION OF CACHEABLE QUERIES

(71) Applicant: ADP, Inc., Roseland, NJ (US)

(72) Inventors: Kuntal Roy, Basking Ridge, NJ (US); Xinpeng Liao, New York, NY (US); Ruchi Jinendra Jain, New York, NY (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/520,359

(22) Filed: Nov. 27, 2023

(65) Prior Publication Data

US 2025/0173332 A1    May 29, 2025

(51) Int. Cl.
    *G06F 16/2453*    (2019.01)
    *G06N 20/00*    (2019.01)
(52) U.S. Cl.
    CPC ......... *G06F 16/2453* (2019.01); *G06N 20/00* (2019.01)
(58) Field of Classification Search
    CPC .............................. G06F 16/2453; G06N 20/00
    See application file for complete search history.

(56) References Cited

U.S. PATENT DOCUMENTS

| | | | |
|---|---|---|---|
| 2011/0055202 A1* | 3/2011 | Heimendinger | G06F 16/245 706/14 |
| 2011/0137888 A1 | 6/2011 | Yoo et al. | |
| 2012/0023120 A1* | 1/2012 | Kanefsky | G06F 16/3322 707/E17.014 |
| 2018/0173705 A1* | 6/2018 | Langseth | G06F 16/2462 |
| 2022/0156340 A1* | 5/2022 | Li | G06F 16/3329 |
| 2024/0119003 A1* | 4/2024 | Tobkin | G06F 12/0842 |
| 2024/0143593 A1* | 5/2024 | Shekhar | G06F 16/219 |
| 2024/0232729 A1* | 7/2024 | Bouvrie | G06N 20/00 |

OTHER PUBLICATIONS

Carsten Sapia, "Promise: Predicting Query Behavior to Enable Predictive Caching Strategies for OLAP Systems", pp. 1-11 ( Year: 2000).*
Ronny Lempel et al, "Predictive Caching and Prefetching of Query Results in Search Engines", ACM, pp. 19-28 (Year: 2003).*
Chen et al., "XGBoost: A Scalable Tree Boosting System", Jun. 10, 2016, arXiv: 1603.02754v3 [cs.LG].
Elsayed et al., "Do We Really Need Deep Learning Models for Time Series Forecasting?", University of Hildesheim, Department of Computer Science, Apr. 12, 2022, arXiv:2204.05529v1 [cs.DB].

(Continued)

*Primary Examiner* — Jared M Bibbee
(74) *Attorney, Agent, or Firm* — Foley & Lardner LLP

(57) ABSTRACT

Predicting cacheable queries is provided. For example, a system integrates one or more processors with a cache store to execute one or more microservices. The system receives a first request including an identifier and a set of key-value pairs. The system predicts a set of requests based on the identifier and the set of key-value pairs. The system identifies based on a comparison with a threshold metric, a subset of predicted requests from the set of requests indicative of one or more subsequent requests. The system constructs a set of labels. The system retrieves, via the set of labels and from a data repository remote from the client service, data for the subset of predicted requests. The system transmits a cache value from the cache store that corresponds to the subsequent request.

20 Claims, 7 Drawing Sheets

(56) References Cited

OTHER PUBLICATIONS

Liu et al., "Monolith: Real Time Recommendation System With Collisionless Embedding Table", ORSUM@ACM RecSys, Sep. 23, 2022, Seattle, WA, USA.
Tang et al., "Forecasting SQL Query Cost at Twitter", Apr. 12, 2022, arXiv:2204.05529v1 [cs.DB].
International Search Report and Written Opinion issued in corresponding International Patent Application No. PCT/US2024/053953, dated Feb. 5, 2025 (16 pages).
Viktoria Bortnikova et al., "6. Queries Classification Using Machine Learning for Implementation in Intelligent Manufacturing", Dec. 1, 2021 (Dec. 31, 2021), pp. 63-74, XP093242947, DOI: 10.24427/978-83-66391-87-1_06, Retrieved from the Internet: URL:https://pb.edu.pl/oficyna-wydawnicza/wpcontent/uploads/sites/4/2021/11/Methods_and_Tools_in_CAD_chapter_06.pdf.

\* cited by examiner

PREDICTION OF CACHEABLE QUERIES

TECHNICAL FIELD

The present application is generally related to computing technology, and particularly to prediction of data queries generated by a client device to improve computing performance.

BACKGROUND

Heterogeneous computing systems can store, retrieve, and process different types of data across different systems.

SUMMARY

This technology is directed to predicting cacheable queries. For example, aspects of the technical solutions disclosed herein can facilitate determining one or more predicted queries. The technology can determine the predicted queries based on a current query and previous queries, if any, from a client device, and cache the data associated with the predicted queries for retrieval by the client device upon subsequent queries.

This disclosure is generally directed to generating predicted queries from at least a current query and previous queries, if any, received from a client device. For example, this technology can identify, based at least on the current request and previous requests if any, predicted requests and can retrieve data associated with a set of the predicted requests for storage in a cache store. Data sets can be requested from a variety of computing systems by a variety of client devices. Sometimes, retrieving the data sets used for responding to the queries from one or more requesting client devices can be computationally expensive. Here, "computationally expensive" indicates that the computational costs required for the retrieval of the data sets being above certain predetermined thresholds. Computational costs can include factors such as bandwidth, time, or processing power.

These retrievals can cause latency, error, traffic congestion, or delay across a system including the client devices and computing systems. Due to the large volume of data files and scale of the heterogenous computing systems, it can be challenging to perform multiple synchronous requests for retrieval of data from a computing system without excessive latency, packet loss, read/write database calls, or generating erroneous computing actions. These technical challenges can further prevent one or more client devices from retrieving requested data due to extensive network traffic and reduced throughput, thereby effecting the efficiency of the system overall.

Technical solutions are provided herein to address such technical challenges. The technical solutions facilitate use of trained machine learning models to determine predicted requests based on received requests and cache data associated with the predicted requests for retrieval upon receipt of a subsequent request. The technical solutions described herein facilitate generating the predicted requests based on identifiers and key-value pairs associated with the received requests using a machine learning model trained on a set of requests and a corresponding data set for the set of requests. Furthermore, the technical solutions described herein facilitate aggregating predicted requests and corresponding cache data at each subsequent prediction, and also removing individual cache values and predicted requests from the cache upon an elapse of a respective cache time. The technical solutions described herein facilitate training the machine learning models using feature encoding and a set of constructed labels to reduce label explosion relative to caching systems which do not use this predictive model, which can be subject to label explosion due to the myriad of combination of input text possible for a query. The technical solutions described herein can further reduce latency compared to caching systems which do not use this predictive model through label explosion, by enabling the machine learning models to process inputs according to the input feature encoding and produce outputs associated with the set of labels.

The identifiers identify the entity, such as a client device, comprising a data query and data source, through information on the client device, a user of the client device, a timestamp, or a user session operating on the client device, for the current user session to retrieve data. The data query includes key-value pairs which include an identifier for a request and parameters for the request. The technical solutions described herein construct labels for the predicted requests based on the request identifiers and the key-value pairs and store the labels and data associated with each of the predicted requests in a cache store. Upon receipt of a subsequent request, the technical solutions described here classify the request based on the labels and determine if a predicted request corresponds to the subsequent request. The technical solutions described herein retrieve the data associated with a predicted request for transmittal to the client device for the subsequent request. Thus, by generating predicted requests and associated labels, the technical solutions described herein reduce latency, bandwidth, and congestion associated with classification of requests and retrieval of data from a remote computing system compared to previous predictive caching systems. Accordingly, the technical solutions described herein are rooted in computing technology, and provide improvements to computing technology, particularly systems that respond to queries from client devices.

At least one aspect of the technical solutions described herein is directed to a system. The system includes one or more processors, coupled with a cache store. The one or more processors receive a first request that includes an identifier and a set of key-value pairs. The one or more processors predicts, using a machine learning model, a set of requests indicative of one or more subsequent requests based on the identifier and the set of key-value pairs from the first request. The one or more processors identifies, using the machine learning model and based on a comparison with a threshold metric, a subset of predicted requests from the set of requests. The subset of predicted requests includes predicted request identifiers and corresponding predicted key-value pairs. The one or more processors constructs, using the machine learning model and based on the predicted request identifiers and the corresponding predicted key-value pairs, a set of labels. The one or more processors retrieves, using the set of labels and from a database, data for the subset of predicted requests. The one or more processors configures, in the cache store, the set of labels as cache keys and the data retrieved for the subset of predicted requests as cache values. The one or more processors transmits, responsive to receipt of a subsequent request that matches one of the subset of predicted requests, a cache value from the cache store that corresponds to the subsequent request.

In some aspects of the technical solutions described herein, the one or more processors receives, via the client service, a second request. The one or more processors predicts, responsive to receiving the second request, via the machine learning model, a second set of requests based on the first request and the second request. The one or more processors identifies, via the machine learning model and based on a comparison with the threshold metric, a second subset of predicted requests from the second set of requests indicative of the one or more subsequent requests. The one or more processors transmits, responsive to receipt of a second subsequent request that matches one of a group of predicted requests comprising the second subset of predicted requests and one or more of the subset of predicted requests that are below a cache store threshold, a cache value from the cache store that corresponds to the second subsequent request.

In some aspects of the technical solutions described herein, each of the set of requests includes a metric associated with a latency of the predicted requests and a frequency of the predicted requests. In some aspects of the technical solutions described herein, identifying the subset of predicted requests includes the one or more processors to determine a metric for each of the set of requests by calculating a product of a latency associated with each of the set of requests and a frequency of receiving each of the set of requests. The one or more processors ranks the set of requests by the respective metrics. The one or more processors selects the subset of predicted requests based on the ranking.

In some aspects of the technical solutions described herein, the one or more processors identifies that the set of requests were marked as cacheable, prior to a training of the machine learning model. In some aspects of the technical solutions described herein, the one or more processors removes the cache keys and the cache values from the cache store responsive to an elapse of a threshold period of time. In some aspects of the technical solutions described herein, in predicting the set of requests based on the identifier and the set of key-value pairs, the one or more processors generates, via the machine learning model, a hash from each of the set of key-value pairs according to a predefined hash function. The one or more processors concatenates, via the machine learning model, each hash with a value of the key-value pairs to generate the input feature encoding. The one or more processors identifies, via the machine learning model, the set of requests by identifying requests associated with the input feature encoding.

In some aspects of the technical solutions described herein, the one or more processors determines that a metric associated with the subset of predicted requests exceeds a rate threshold. The one or more processors generates a schedule of retrieval for the subset of predicted requests. The one or more processors retrieves, via the set of labels and from the data repository remote from the client service, the data for the subset of predicted requests according to the schedule. In some aspects of the technical solutions described herein, the one or more processors suggests one or more of the subsequent requests by presenting the one or more subsequent requests in an application operating on the client service.

In some aspects of the technical solutions described herein, the one or more processors trains the machine learning model to capture a temporal pattern of requested profiles associated with the client service based on historical data associated with a set of profiles from entities. Each profile of the requested profiles is one of the set of profiles associated with an entity of the entities. In some aspects of the technical solutions described herein, the one or more processors predicts, via the machine learning model, the set of requests based on received requests from the client service during a user session. Each received request of the received requests includes an identifier of an entity and a profile associated with the client service. Each entity is associated with a set of profiles including the respective profile of each received request.

At least one aspect of the technical solution described herein is directed to a method. The method includes generating, by one or more processors using a machine learning model on a first identifier and a first set of key-value pairs identified from a first client request, a set of predicted requests indicative of one or more subsequent requests. The method includes identifying, by the one or more processors using the machine learning model, a subset of predicted requests from the set of predicted requests. Each predicted request of the subset of predicted requests includes a predicted identifier and a set of predicted key-value pairs. The method includes caching, by the one or more processors for the subset of predicted requests, based on each predicted identifier and set of predicted key-value pairs, data from a database in a cache store. The method includes transmitting, by the one or more processors, responsive to receipt of the one or more subsequent requests that matches one of the subset of predicted requests, data from the cache store that corresponds to the one or more subsequent requests.

In some aspects of the technical solutions described herein, the method includes receiving, by the one or more processors, a second client request. The method includes predicting, by the one or more processors, responsive to receiving the second client request, a second set of predicted requests indicative of one or more subsequent requests based on the first client request and the second client request. The method includes identifying, by the one or more processors using the machine learning model and based on a comparison with a threshold metric, a second subset of predicted requests from the second set of predicted requests. The method includes transmitting, by the one or more processors, responsive to receipt of a second subsequent request that matches one of a group including the second subset of predicted requests and one or more of the subset of predicted requests that are below a cache store threshold, a second cache value from the cache store that corresponds to the second subsequent request.

In some aspects of the technical solutions described herein, identifying the set of predicted requests includes determining, by the one or more processors, a metric for each of the set of requests by calculating a product of a latency associated with each of the set of requests and a frequency of receiving each of the set of requests. The method includes ranking, by the one or more processors, the set of requests by the respective metrics. The method includes selecting, by the one or more processors, the subset of predicted requests based on the ranking. In some aspects of the technical solutions described herein, predicting the set of requests based on the identifier and the set of key-value pairs includes generating, by the one or more processors, using the machine learning model, a hash from each of the set of key-value pairs according to a predefined hash function. The method includes concatenating, by the one or more processors, using the machine learning model, each hash with a value of the key-value pairs to generate the input feature encoding. The method includes identifying, by the one or more processors, using the machine learning model, the set of requests by identifying requests associated with the input feature encoding.

In some aspects of the technical solutions described herein, the method includes determining, by the one or more processors, that a metric associated with the subset of predicted requests exceeds a rate threshold. The method includes generating, by the one or more processors, a schedule of retrieval for the subset of predicted requests. The method includes retrieving, by the one or more processors, the data for the subset of predicted requests according to the schedule. In some aspects of the technical solutions described herein, the method includes training, by the one or more processors, the machine learning model to capture a temporal pattern of requested profiles based on historical data associated with a plurality of profiles from entities. Each profile of the requested profiles is one of the set of profiles associated with an entity of the entities.

In some aspects of the technical solutions described herein, the method includes predicting, by the one or more processors using the machine learning model, the set of requests based on received requests from the client service during a user session. Each received request of the received requests includes an identifier of an entity and a profile. Each entity is associated with a set of profiles including the respective profile of each received request.

At least one aspect of the technical solutions described here is directed to a non-transitory computer-readable medium. The non-transitory computer readable medium includes instructions to cause a processor to generate a set of predicted requests using a machine learning model, based on one or more requests received from a client device. The instructions cause the processors to compute, for each predicted request of the set of predicted requests, a metric associated with retrieving data for the respective predicted request from a database. The instructions cause the processor to select a subset of the set of predicted requests based on the metric corresponding to each predicted request and a threshold metric. The instructions cause the processor to cache, for the subset of the predicted requests, data from the database in a cache store. The instructions cause the processor to transmit, responsive to receiving a client request matching a predicted request of the subset of predicted requests, corresponding data from the cache store.

In some aspects of the technical solutions described herein, the instructions cause the processor to receive, via the client service, a second request. The instructions cause the processor to predict, responsive to receiving the second request, using the machine learning model, a second set of predicted requests based on the first request and the second request. The instructions cause the processor to identify, using the machine learning model and based on a comparison with the threshold metric, a second subset of predicted requests from the second set of predicted requests indicative of one or more subsequent requests. The instructions cause the processor to transmit, responsive to receipt of a second subsequent request that matches one of a group of predicted requests comprising the second subset of predicted requests and one or more of the subset of predicted requests that are below a cache store threshold, a second cache value from the cache store that corresponds to the second subsequent request.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

Aspects of the technical solutions described herein are described in the detailed description which follows, in reference to the noted plurality of drawings by way of non-limiting examples of exemplary embodiments of the present disclosure.

DETAILED DESCRIPTION OF ASPECTS OF THE INVENTION

Figure 1:
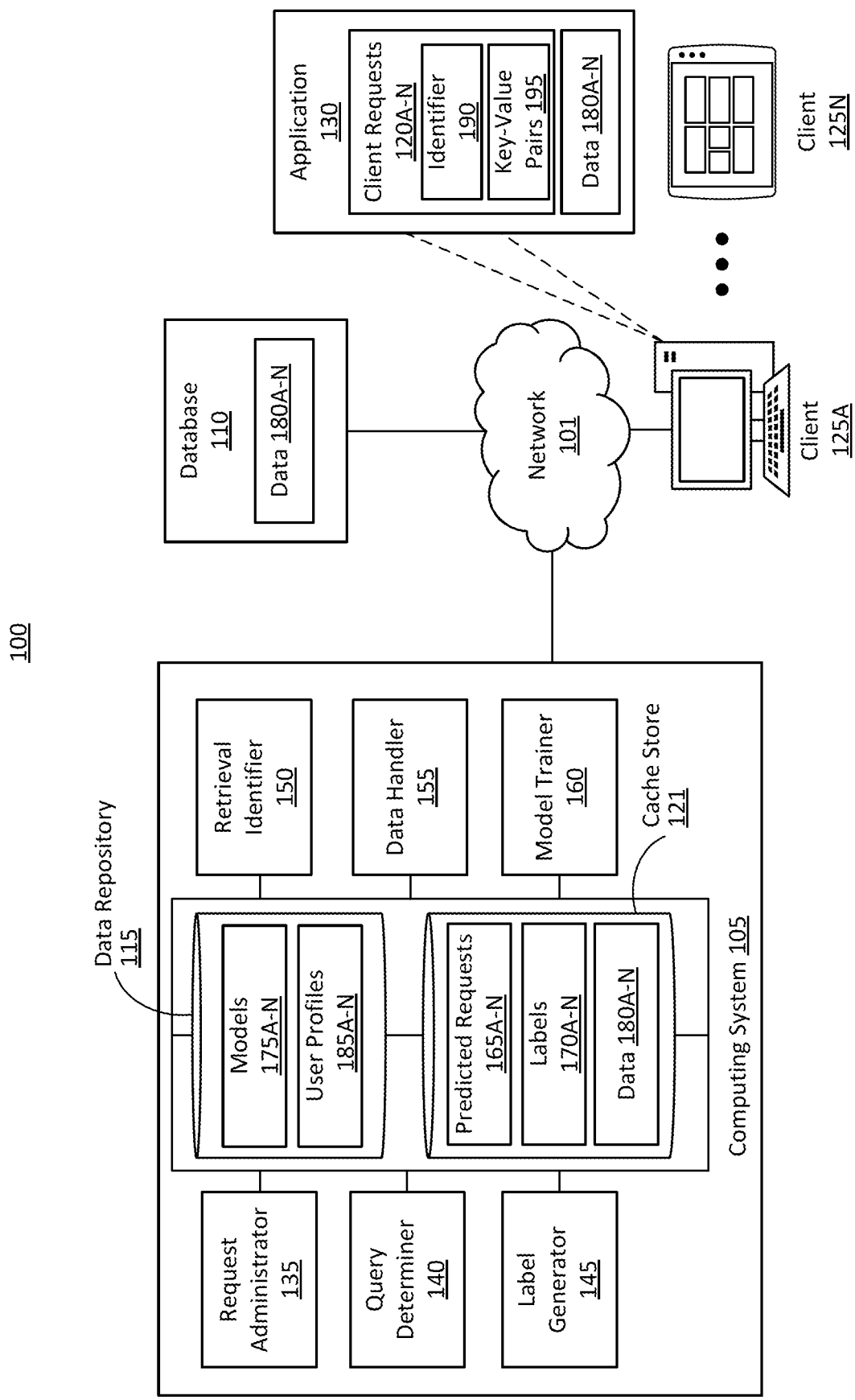
FIG. 1 depicts an example system of prediction of cacheable queries.

Following below are more detailed descriptions of various concepts related to, and implementations of, methods, apparatuses, and systems to predict cacheable queries. The various concepts introduced above and discussed in greater detail below can be implemented in any of numerous ways.

This disclosure is generally directed to predicting queries using previous queries and caching data related to the predicted queries in association with one or more constructed labels to present to a requesting client device. For example, this technology can receive one or more queries during a session to retrieve data and, based on the received queries, iteratively generate prediction of future queries. A remote computing system, such as a database, receives multiple queries from multiple different computing systems such as multiple different client devices. A technical challenge exists that, the database has a limited bandwidth and hence, only a limited subset of the received queries are processed. Furthermore, the database utilizes large amounts of energy due to operation of the processors associated with the database and cooling of the systems when continuously retrieving data associated with multiple independent queries. The database experiences challenges related to bandwidth, congestion, and processing power by receiving queries at undetermined times and in undetermined quantities.

For example, multiple client devices attempt to access data from the database within a threshold range of time. The database may be unequipped to process such a quantity of queries. The database being unequipped includes the bandwidth associated with incoming queries to the database or outgoing data from the database being insufficient to support the quantity of queries. Furthermore, the routing architecture between the database and each client device will suffer from packet or data loss due to an influx of the quantity of queries. Additionally, as more queries are transmitted to the database, the database will become overwhelmed by receiving more queries than it is able to process, thereby causing an overflow, congestion, or other such error. The database may overheat above an operating temperature if capacity of the database is continuously overrun, thereby reducing the lifetime of the database itself. Due to these technical challenges, the client devices transmitting the queries experience a delay in receiving data associated with the queries from the database.

The technical solutions described herein predict future queries based on prior received queries and retrieve data associated with the predicted queries to store in a cache store at scheduled intervals to reduce network congestion at the database. Furthermore, using the predicted future queries, the technical solutions described herein retrieve data related to the queries and generate a set of labels to associate with the data. Upon a subsequent receipt of a query relating to a label of the labels, the technical solutions described herein provide the data associated with the label from the cache store to one or more client devices via an application executing on the one or more client devices. By predicting future queries, scheduling data retrieval from the database based on the predicted queries, and creating labels based on the predicted queries, latency and delay within the system between the client devices and remote database is reduced compared to caching systems which do not use this predictive model.

FIG. 1 depicts an example system 100 that facilitates predicting cacheable queries according to one or more aspects of the technical solutions described herein. The system 100 includes a computing system 105, a database 110, a plurality of clients 125A-N (sometimes hereinafter referred to as the client(s) 125, the client device(s) 125, or the client service(s) 125), and a network 101. The computing system 105 includes a request administrator 135, a query determiner 140, a label generator 145, a retrieval identifier 150, a data handler 155, a model trainer 160, or a data repository 115. The request administrator 135, the query determiner 140, the label generator 145, the retrieval identifier 150, the data handler 155, the model trainer 160, and the data repository 115 each communicates with the database 110 or the clients 125 via the network 101.

The data repository 115 is any memory, storage, or cache for storing information or data structures of the system 100. The data repository 115 contains any information about the system 100 and allows that data to be accessed by any components of the system 100, such as by communication methods described herein. The data repository 115 contains at least predicted requests 165A-N, labels 170A-N, models 175A-N, data 180A-N, or user profiles 185A-N, among others. The information in the data repository 115 is stored in any kind of memory, such as a cloud or hard drive. The data repository 115 includes, for example, random access memory (RAM), dynamic random access memory (DRAM), static random access memory (SRAM), error-correcting code (ECC), read only memory (ROM), programmable read only memory (PROM), or electrically erasable read only memory (EEPROM). The information or data structures (e.g., tables, lists, or spreadsheets) contained within the data repository 115 is dynamic and changes periodically (e.g., daily or every millisecond); via an input from a user (e.g., a user operating the client device 125); via information from the database 110, or the client 125, transmitted through the network 101; via inputs from subcomponents of the computing system 105 (e.g., the label generator 145 or the retrieval identifier 150), or via an external update to the system 100. For example, the models 175 within the data repository 115 change or are updated responsive to an indication from the model trainer 160.

The data repository 115 includes or is a cache store. A cache store is a type of memory, data repository, database, or other structure for storing data structures. In some aspects of the technical solutions described herein, the cache store is characterized by a duration of time with which the data structures within the cache store are stored. For example, data structures or information within the cache store are maintained, stored, or otherwise present within the cache store for a period of time. In some aspects of the technical solutions described herein, the cache store is characterized by a location of the cache store. For example, the cache store is located within the computing system 105, or the client 125. In this manner, the cache store is referred to or considered local storage. In some embodiments, accessing the cache store (by the computer system 105, the client 125, among others) enables the computing system 105 or the client 125 to access the information within the cache store (such as the data 180A-N) with less time, latency, or computational power than accessing the information (such as the data 180A-N) from a remote database, such as the database 110.

The database 110 is or includes a system or computing device including the data 180A-N (hereinafter sometimes referred to as the data 180). The database 110 is or includes a storage or data repository to store the data 110. The database 110 is located remotely from the computing system 105 or the client 125. For example, the database 110 corresponds to or is maintained by an outside entity such as a government, individual, company, or non-profit organization. In some aspects of the technical solutions described herein, the database 110 is maintained, owned, or operated by the same entity as an entity maintaining, owning, or operating the computing system 105. In some aspects of the technical solutions described herein, the database 110 is accessed by approved computing systems, such as the computing system 105 operating under the same entity as the database 110. Although a single database 110 is depicted, the database 110 can include multiple databases.

The database 110 maintains, includes, stores, or otherwise hosts the data 180. The data 180 is any set of data aggregated, accumulated, calculated, generated, or otherwise available to an entity. The data 180 includes information about an entity. The entity includes an individual, such as an employee of an organization as described herein, or a grouping of people, such as an organization, corporation, or educational institution. The information includes data like name, address, social security number, salary, personally identifying information, demographic information, familial information, tax information, benefits information, or other such information. The data 180 includes information about an entity such as location of the entity (e.g., an address, physical or coordinate location, a geofence associated with the entity), employees of the entity, tax information, financial information, proprietary information, among other information. For example, the database 110 can be an external computing system maintaining a data repository of the average salary for government employees in a specific county. In this example, the collection of the salaries can be included in the data 180.

The data 180 includes a plurality of values. The values can be alpha-numeric. In some cases, the values are displayable on a screen, such as that of the client device 125, the database 110, or the computing system 105. For example, the data 180 can include strings such as "First Name" or "Earnings" or "130,000" or "0.60." The data 180 can include auditory values, such as a sound or vocal recording. The data 180 can include colored or color-coded values. The data 180 can include time-related values, such as a current time, elapsed time, clock-in time, among others. The data 180 can include images. The values of the data 180 includes any combination of values. For example, a first value of the data 180 includes an image and a string, and a second value of the data 180 includes an auditory value. The values of the data 180 can relate to each other. In an example, a value of "Earnings" corresponds to a value of "4,657." Some values of the data 180 can be null or zero values.

The database 110 arranges values of the data 180 in a specified manner, such as a table, a list, or other defined data structure. The database 110 includes different values within the data 180. For example, the database 110 maintains data 180A corresponding to demographics of library card holders with different values and arrangements of those values for the data 180A than a second data 180B corresponding to payroll periods for employees of the department of transportation.

The data 180 includes different attributes, such as a file type, data type, vendor type, or other such attributes. The data 180 is included in, denoted by, or transmitted as an electronic file type. Examples of electronic file types include comma separated values (CSV), excel files (XLS or XLSM), or data interchange format (DIF), JavaScript Object Notation (JSON), among others. The data 180 can be associated with or stored as a file type. The file type determines or relates to data structures associated with the data 180. In some aspects of the technical solutions described herein, the data 180 is encrypted by the database 110, such as by Advanced Encryption Standard (AES), Rivest-Shamir-Adleman (RSA), or another encryption standard. The data 180 can be unencrypted by the database 110, or by another system enabled for access to the data 180, such as the computing system 105. In some aspects of the technical solutions described herein, one or more client requests access to the data 180 or requests the data 180 itself from the database 110 via the computing system 105 or through another computing system or the client 125 directly.

The client device 125 is or includes any computing device such as a laptop, a desktop computer, a smart phone, a tablet, etc. A user may operate, display, or otherwise execute an application 130 via the client device 125. The client device 125 can be coupled with storage or memory. In some aspects of the technical solutions described herein, the client device 125 is operated by a user associated with an organization to perform various tasks associated with the organization. The client device 125 executes the application 130. The application 130 is any platform for performing the various tasks associated with the organization, such as a low-code platform, no-code platform, software-as-a-service platform (SaaS), web application, web browser, desktop application, among others. In some aspects of the technical solutions described herein, the application 130 is or includes an electronic transaction system for maintaining a data set to perform a transaction.

Examples of the electronic transaction system include a system for running a payroll for a company, onboarding new employees, maintaining tax or accounting information, operating financial transfers such as payment to an employee or depositing in a bank account, transferring assets or information such as through a library or research database, maintaining medical records, maintaining legal records, or any other system or application in which data sets are manipulated or maintained. In some aspects of the technical solutions described herein, the application 130 maintains or operates on the data 180 or a subset of the data 180.

The application 130 generates and transmits client requests 120A-N (hereinafter sometimes referred to as the client request(s) 120) for retrieval of the data 180. The client requests 120 are one or more requests for information transmitted by the client 125. The client request 120 indicates information or the data 180 to be retrieved from the database 110 for use in the application 130. In some examples, the client request 120 includes criteria of the information or data 180 to be retrieved. The client request 120 is transmitted from the application 130 executing on the client 125 to the computing system 105 to query for the data 180. The application 130 can transmit the client request 120 responsive to an actuation of one or more user interface elements associated with the client device 125. For example, the application 130 can transmit the client request 120 upon the user making a selection, entering input, typing, clicking, touching, speaking, gesturing, or another such interaction with the application 130 via one or more user interface elements of the client 125. The application 130 can transmit the client request 120 responsive to a scheduled data query for the application 130, such as weekly, daily, monthly, etc. The application 130 can transmit the client request 120 for the data 180 responsive to one or more microservices of the application 130 requesting the data 180 for performing functions or operations associated with the data 180. Here, microservices of the application 130 include microservices that the application 130 uses, and may be provided by other applications executing on the client 125.

The client requests 120 includes identifiers 190 and a set of key-value pairs 195, among others. The identifiers 190 are or include a series of letters, numbers, images, or other symbols to identify various attributes of a session for procuring the data 180. The identifier 190 identifies the session for procuring the data 180. The session includes or refers to a session for the execution of the application 130, a session for performance of a task in conjunction with the application 130, a session over a period of time (e.g., 8 hours), or any other such duration in which the application 130 queries for the data 180. The identifiers 190 can identify a duration of the session, a user profile 185A-N operating the session, actions taken during the session, among other attributes of the session. The session includes attributes such as one or more of the user profiles 185A-N operating the sessions, actions taken during the session, among other attributes of the session. For example, a first identifier identifies a first session and a first user profile 185A operating the first session by performing first actions during the first session, and a second identifier identifies a second session and the first user profile 185A operating the second session by performing second actions taken during the second session. For example, the first identifier identifies a first session operated by the first user profile 185A and the second identifier identifies a second session operated by a second user profile 185B.

The identifier 190 can identify a user profile 185A-N. The user profile 185A-N (hereinafter generally referred to as the user profile(s) 185) is or includes a profile associated with a user of the application 130. In some examples, the user profile 185A-N refers to a profile of the user associated with the client device 125. The user profile 185 identifies attributes of the user, such as a name, location (e.g., home address, work address, coordinates, or IP address), demographic information (e.g., gender, sex, race, ethnicity, age, among others), profession, historical usage of the application 130 (e.g., user interface elements interacted with, timestamps of usage, etc.), among other information. The data repository 115 stores the user profile 185. The computing system 105, the client device 125, or another system updates the user profiles 185A-N to add a new user profile, remove a user profile, or update information within the user profile 185. The identifier 190 identifies the one or more user profiles 185 operating the application 130 via the one or more clients 125.

The identifier 190 can identify a trace of the session. The trace includes a traffic history of information (such as the data 180). For example, the trace catalogues the timestamps and routing locations for a piece of information throughout a network, such as the system 100. The identifier 190 identifies a page load of the session. In some aspects of the technical solutions described herein, a page load is an instance when content items of a webpage, browser, application, or platform, among others, are fully loaded or operable. The identifier 190 identifies an entity associated with the session. For example, the identifier 190 can associate a company, non-profit, or government agency with the session.

The key-value pairs 195 identify one or more client requests 120 and parameters associated with the identified client request 120. In some aspects of the technical solutions described herein, each key-value pair include a first value and a second value. The first value is an identifier for the client request 120. The first value identifies a first client request 120A based on a type of the request or a time of the request, among others. The type of request includes a type of user interface element of the client device 125 interacted with to elicit the client request 120, a type of the data 180 requested, among others. In some aspects of the technical solutions described herein, the first value identifies the first client request 120A as the type of the request. The first value can identify the first client request 120A at a time of the client request 120A. For example, the first value identifies a transmittal of the client request 120 or a receipt of the data 180 from the client request 120. In some aspects of the technical solutions described herein, a first key-value pair shares the same first value with a second key-value pair. For example, a client request 120A from a first client device 125A includes the same request type and timestamp as a second client request 120B from a second client device 125B.

The second value of the key-value pair 195 includes parameters for the client request 120. The parameters include the data 180 to be requested, values associated with the data 180, name of the data 180, among others. For example, the parameters of the second value include a name of a first data 180A and a value of the first data 180A. The value of the first data 180A can be initially null within the key-value pair and can be updated responsive to retrieval of the data 180A.

The application 130 transmits the client request 120 to the computing system 105 via the network 101. The network 101 is a wireless or wired connection for enabling the computing system 105, the database 110, or the application 130 to store, transmit, receive, or display information to predict cacheable queries. The computing system 105 communicates with internal subcomponents (described herein) or external components (e.g., the database 110, or the client device 125, among others) via the network 101. The computing system 105, for example, stores data about the system in data repository 115. The computing system 105, for example, receives the client request 120 transmitted by the application 130 executing on the client device 125. The network 101 includes a hardwired connection (e.g., copper wire or fiber optics) or a wireless connection (e.g., wide area network (WAN), controller area network (CAN), local area network (LAN), or personal area network (PAN)). For example, the network 101 includes WiFi, Bluetooth, BLE, or other communication protocols for transferring over networks as described herein.

The computing system 105 interfaces with, communicates with, or otherwise receives or provide information with the database 110, the client 125, among others. The computing system 105 includes or interfaces with at least one logic device such as a server. The server is a computing device having a processor to communicate via the network 101. The computing system 105 includes or interfaces with the at least one server. The server is a computation resource, server, processor or memory. For example, the computing system 105 includes a plurality of computation resources or processors. The server facilitates communications between the computing system 105, the database 110, and the client 125 via the network 101.

In an illustrative example, the computing system 105 retrieves the data 180 from the database 110 to store in a cache store 121. The request administrator 135 receives the client request 120 from the application 130 executing on the client device 125. The query determiner 140 generates predicted requests 165A-N based on the client request 120. The label generator 145 constructs a set of labels 170A-N based on the predicted requests 165A-N. The retrieval identifier 150 identifies a subset of the predicted requests 165A-N as being above a threshold metric. The data handler 155 retrieves the data 180 associated with the subset of the predicted requests 165A-N for storage in the cache store with the set of labels 175A-N. The request administrator 135 transmits the stored data from the cache store to the client 125 device, responsive to receiving a client request 120 which corresponds to one or more of the set of predicted requests 165A-N. The model trainer 160 trains one or more machine learning models 175A-N to perform the functionalities described herein.

The request administrator 135, the query determiner 140, the label generator 145, the retrieval identifier 150, the data handler 155, or the model trainer 160 can each include at least one processing unit or other logic device such as programmable logic array engine, or module configured to communicate with the data repository 115 or database. The request administrator 135, the query determiner 140, the label generator 145, the retrieval identifier 150, the data handler 155, or the model trainer 160 can be separate components, separate microservices, a single component, or part of the computing system 105. The system 100 and its components, such as the computing system 105, includes hardware elements, such as one or more processors, logic devices, or circuits.

The computing system 105 includes one or more microservices configured to be executed by the one or more processors of the computing system 105. Each microservice communicates with other microservices to perform a function. In some embodiments, each microservice is located on a separate server or one or more microservices are located on the same server. In some aspects of the technical solutions described herein, each microservice corresponds to a processor of the computing system 105 or one or more microservices has their functionalities executed by the same processors. In some aspects of the technical solutions described herein, subcomponents of the computing system 105, such as the request administrator 135, the query determiner 140, the label generator 145, the retrieval identifier 150, the data handler 155, or the model trainer 160, can each be or include a microservice. In some embodiments, the microservices can operate or execute on the application 130.

For example, in some aspects of the technical solutions described herein, the operations of the computing system 100 can operate on or be performed by the application 130 operating on the client device 125.

In some embodiments, the application 130 can perform one or more of the functionalities of the computing system 105, such as the functionalities associated with the request administrator 135, the query determiner 140, the label generator 145, the retrieval identifier 150, the data handler 155, or the model trainer 160. For example, the application 130 can perform some or all of the functionalities of the query determiner 140, or the application 130 can include the query determiner 140. In some aspects of the technical solutions described herein, the application 130 can include one or more of the subcomponents of the computing system 105, such as one or more of the request administrator 135, the query determiner 140, the label generator 145, the retrieval identifier 150, the data handler 155, or the model trainer 160.

The computing system 105 includes a request administrator 135 designed, constructed, and operational to receive, identify, obtain, or otherwise access the client requests 120. The request administrator 135 is any combination of hardware and software for collecting, storing, reading, receiving the client requests 120 from the application 130 operating on the client 125. For example, the request administrator 135 receives a first client request 120A from the application 130 executing on the client 125 and identifies the identifier 190 and the key-value pairs 195 associated with the client request 120. In some aspects of the technical solution described herein, the request administrator 135 identifies the client request 120 transmitted to a different computing system. For example, the request administrator 135 routes the client request 120 received by the request administrator 135 to a different computing system, or the request administrator is operating on the client device 125 as described herein.

Identifying the client request 120 includes the request administrator 135 identifying, storing, or otherwise receiving the identifier 190 and the key-value pairs 195 associated with the client request 120. The request administrator 135 stores the client requests 120 in the data repository 115. In some aspects, the request administrator 135 stores the client requests 120 in the data repository for a period of time. Upon the elapse of the period of time, the request administrator 135 removes the client requests 120 from the data repository 115. In some aspects, the request administrator 135 removes the client requests 120 from the repository by deleting the client requests 120, or by moving the client requests to another storage or database. In some aspects, the request administrator 135 stores a number of the client requests 120 in the data repository 115. For example, the request administrator 135 can store 1, 5, 10, or another number of the received client requests 120 over the session in the data repository 115. The request administrator 135 stores the client requests 120 according to time received, time responded to, size of the client request (e.g., in bits or bytes of the request or the data 180 indicated in the client request 120), frequency of the client request, among others.

The request administrator 135 can identify the session based on the client request 120. In some embodiments, the request administrator 135 can determine, based on the identifier 190 or the key-value pairs, among others, that a first request 120A is a part of a session. The request administrator 135 identify one or more user profiles 185 associated with the client request 120 from at least the identifier 190. The request administrator 135 identifies one or more of the data 180 indicated in the request based on at least the key-value pairs 195.

The computing system 105 includes a query determiner 140 designed, constructed, and operational to determine, via a machine learning model, a set of requests based on the identifier 190 and the set of key-value pairs 195. The query determiner 140 is any combination of hardware and software for predicting, determining, or generating a set of predicted requests 165A-N based on the client requests 120. For example, the query determiner 140 generates the set of predicted requests 165A-N based on the client requests 120 received historically.

The predicted requests 165A-N (hereinafter generally referred to as the predicted request(s) 165) are one or more requests or queries generated by the query determiner 140 to be determined to be likely to correspond to a subsequent client request 120. For example, the predicted request 165 is a query which is likely to correspond to a future client request 120 received from the application 130 during the session. Here, a predicted request 165 "corresponding to" a client request 120 indicates that the predicted request 165 and the client request, both, use, include, or identify, or refer to the same data 180 from the database 110. For example, a first predicted request 165A can use a first data 180A and an incoming client request 120 can also use the first data 180A. Upon receipt of the incoming client request 120 that uses the first data 180A, the first predicted request 165A is said to correspond to the client request 120.

The query determiner 140 determines the predicted requests 165 based on the identifiers 190 and the key-value pairs 195 of the clients requests 120. In some aspects of the technical solutions described herein, the request administrator 135 receives one or more of the client requests 120 over the duration of the session. The query determiner 140 determines, based on one or more of the received client requests 120 during the session, the predicted requests 165. The query determiner 140 predicts the predicted requests 165 based on the identifiers 190 and the key-value pairs 195 of the received client requests 120 during the session.

In some aspects of the technical solutions described herein, the query determiner 140 determines the predicted requests 165 based on client requests associated with a user profile 185 operating the session. For example, the query determiner 140 determines the predicted requests 165 based on historical sessions including historical client requests provided by the user profile 185. In some aspects of the technical solutions described herein, the query determiner 140 determines the predicted requests 165 based on sessions or client requests associated with user profiles similar to the user profile 185 engaging in the current session. For example, one or more of the user profiles 185 includes similar historical requests, sessions, demographic information, or other information contained within the user profiles 185. The query determiner 140 determines the predicted requests 165 using the client requests 120 or the sessions associated with the similar user profiles for the current session. A similar user profile includes a user profile with matching attributes, such as matching demographic attributes, organizational attributes, employee attributes, or session history, among others.

The query determiner 140 determines the predicted requests 165 based on a set of the received client requests 120. As an illustrative example, the request administrator 135 receives ten client requests 120 during the session at the time of the query determiner 140 generating the predicted requests 165, but the query determiner 140 can use one, five, ten, or another number of the received client requests 120 to determine the predicted requests 165. In some aspects of the technical solutions described herein, the query determiner 140 determines the predicted requests 165 subsequent to the receipt of each client request 120. For example, the query determiner 140 is triggered to re-determine the predicted requests 165 each time (or at a different interval) the request administrator 135 receives a client request 120 from the application 130. In this manner, the query determiner 140 uses recently received client requests to determine the predicted requests 165.

The query determiner 140 generates the predicted requests 165 using one or more models 175A-N. The models 175A-N (hereinafter generally referred to as the model(s) 175) includes one or more machine learning models, algorithms, or ensembles of machine learning models to determine the predicted requests 165 based on received client requests 120. The models 175 accept inputs to determine an output of the set of predicted requests 165. For example, the model 175 uses the identifier 190 and the key-value pairs 195 of one or more client requests 120 to determine the predicted requests 165.

In some aspects, the models 175 include one or more neural networks, decision-making models, linear regression models, natural language models, random forests, classification models, reinforcement learning models, clustering models, neighbor models, decision trees, probabilistic models, classifier models, or other such models. For example, the models 175 include natural language processing (e.g., support vector machine (SVM), Bag of Words, Counter vector, Word2Vec, k-nearest neighbors (KNN) classification, long short term memory (LSTM)), object detection and image identification models (e.g., mask region-based convolutional neural network (R-CNN), CNN, single-shot detector (SSD), deep learning CNN with Modified National Institute of Standards and Technology (MNIST), RNN based long short term memory (LSTM), Hidden Markov Models, You Only Look Once (YOLO), LayoutLM), classification ad clustering models (e.g., random forest, XGBoost, k-means clustering, DBScan, isolation forests, segmented regression, sum of subsets 0/1 Knapsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, date parser, conditional random field model, Bidirectional Encoder Representations from Transformers (BERT), among others. It should be understood that this listing of machine learning models is exemplary and is not to be construed as exhaustive or limiting.

The model 175 accepts one or more of the client requests 120 as inputs during the session to determine the predicted requests 165. For example, the query determiner 140 determines, using the model 175, the predicted requests 165 by providing the identifier 190, the key-value pairs 195, or a combination thereof to the model 175. The models 175 can accept inputs in addition to or instead of the identifiers 190 and the key-value pairs 195. Such inputs include a time associated with the client requests 120 (e.g., a time of receipt of the client request 120 by the computing system 105 or a time of transmittal of the client request 120 by the client device 125), historical information (e.g., last receipt of a client request 120, a listing of the data 180 that the application 130 has received, a user profile of the user profiles 185 associated with the client 125, prior outcomes determined by the computing system 105 or the models 175, among others), publicly or privately available data (e.g., databases or references from outside entities such as governments, non-profits, educational institutions, or data aggregated by the computing system 105, the client 125, or the database 110), user inputs (e.g., user annotations of one or more client requests 120), among others. The model 175 generates the predicted requests 165 based on such input.

The query determiner 140 stores the predicted requests 165 in the cache store 121. The cache store 121 is any hardware or software configured to store one or more data structures (such as the predicted requests 165, labels 170A-N, or data 180A-N) for a threshold period of time. The cache store 121 is coupled with the data repository. In an example, the cache store is located within the data repository 115. In an example, the cache store 121 is located in a separate memory than the data repository 115 but is coupled to the cache store 121 such that the cache store 121 is readable and writable by the data repository 115.

The computing system 105 includes a label generator 145 designed, constructed, and operational to generate, determine, or otherwise construct a set of labels 170A-N based on the identifiers 190 and the key-value pairs 195. The label generator 145 is any combination of hardware and software for generating the labels 170A-N using one or more of models 175. For example, the label generator 145 provides to the models 175 the key-value pairs 195 and the identifiers 190 from the received client requests 120 to determine the labels 170 for the predicted requests 165.

The labels 170 are or include a set of classifications for predicted requests 165A-N to reduce the variability among the predicted requests 165A-N. Due to a vast amount of potential differences between user-initiated client requests 120 (such as differences in spelling, selection, typing, or other such variances in user input), the labels 170 are constructed such that the number of outputs of the models 175 is maintained within a threshold number of outputs and in a format discernable by the computing system 105. In some aspects of the technical solutions described herein, the labels 170 include or are cache keys. The label generator 145 configures the labels 170 as cache keys. In some aspects, the label generator 145 constructs the labels 170 using one or more of the client requests 120. For example, the label generator 145 constructs the labels 170 using the identifiers 190 and corresponding key-value pairs 195. In some aspects of the technical solutions described herein, the label generator 145 generates the labels using more than one client requests 120, such as 2, 5, or 10 of the received client requests 120. For example, the label generator 145 is configured to take as input the five most recently received client requests 120, or the client requests 120 received within a threshold period of time, or any other identifiable subset of received client requests 120.

Generating the labels 170 includes generating the predicted requests 165. In some aspects of the technical solutions described herein, the functionalities of the label generator 145 and the query determiner 140 overlap or operate concurrently. For example, the query determiner 140 determines the predicted requests 165 according to the generated labels 170. As an illustrative example, the query determiner 140 can restrict the generation of the predicted requests 165 to predicted requests 165 which conform to, match, or otherwise are associated with the labels 170.

The label generator 145 associates each of the predicted requests 165 with a label of the labels 170. The label generator 145 determines, based on the predicted requests 165, if the predicted request 165 matches a label of the generated labels 170. Matching refers to the predicted request 165 being in a format conforming to the label 170, having an identifier or key-value pairs associated or identified within the label 170, among others. The label generator 145 associates the label 170 with the predicted request 165 for each predicted request matching a label.

In some aspects of the technical solutions described herein, one or more of the predicted requests 165 does not correspond to a label 170. For example, the label generator 145 can generate labels 170 corresponding to a threshold frequency or prevalence of identifier, data 180, key-value pairs, or another attribute of the system 100. In some aspects, a predicted request 165 does not correspond to a frequency label 170 if the predicted request 165 does not occur with at least a predetermined frequency associated with the frequency label. In this manner, in some aspects one or more of the predicted requests 165 cannot conform to a threshold frequency of the labels 170.

In a similar manner, the query determiner 140 does not generate the predicted requests 165 which do not conform to one or more of the labels 170. By generating predicted requests that conform to the labels 170, excessive filtering, processing, or other computations on the predicted requests 165 is reduced compared to previous predictive caching systems. In this manner, computational resources such as the consumption of power by the processors or as latency within the system 100 can be reduced by curating the predicted results 165 based on the labels 170.

In some aspects of the technical solutions described herein, the label generator 145 modifies one or more inputs to the models 175. The label generator 145 modifies, encodes, or otherwise generates inputs to the models 175 using at least the identifier 190 or the key-value pairs 195 of the received client requests 120. In some aspects of the technical solutions described herein, the label generator 145 creates a hash from the identifiers 190 and the key-value pairs 195 to use as input to the models 175. For example, the label generator 145 creates a hash based on the client requests 120 for the query determiner 140 to use as input to the model 175 to generate the predicted requests 165.

In some aspects of the technical solutions described herein, modifying the inputs to one or more of the models 175 can include efficient feature encoding. Efficient feature encoding refers to generating inputs for the model 175 using the client request 120. Efficient feature encoding reduces time and computational power for the model 175 to process the inputs to produce outputs (such as the predicted requests 165) by providing inputs corresponding to a format based on the client requests. In this manner, the model 175 receives structured inputs based on the client requests 120 to streamline training of the model 175, generating of the predicted requests 165 by the model 175, among others.

The label generator 145 generates, modifies, or otherwise provides the inputs to the model 175 by generating a hash based on the client requests 120. In some aspects of the technical solutions described herein, the label generator 145 generates a hash from each of the key-value pairs 195 according to a predefined hash function. A hash function is or includes a mathematical function to transform data of varying size into data of fixed-length values. Data varies in size such as storage size (e.g., bits, bytes), vector size (e.g., dimensions of the vector), string length (e.g., characters within a data string), frequency (e.g., a first data appearing more or less frequently than a second data) among others. A hash function generates a hash based on the inputs to the hash function. A hash is or includes the output of the hash function, such as a fixed-size data or data set. For example, a hash function transforms the second value of each key-value pair 195 of varying vector dimensions into structured key-value pairs 195 which comply with a fixed vector size. The hash function is one or more of an entropy function, loss function, expectation function, division method, mid square method, folding method, a combination thereof, or another algorithm developed to transform data of a data set to a fixed size.

The label generator 145 generates inputs to the models 175 based on the hash. In some aspects of the technical solutions described herein, the label generator 145 generates a hash using the key-value pairs 195 of the client requests 120. The label generator 145 concatenates each hash associated with each key-value pair 195 with a value of its respective key-value pair to generate inputs to the model 175. In some aspects of the technical solutions described herein, concatenating each hash to generate inputs to the model 175 includes generating input feature encoding. The label generator 145 generates input feature encoding by, for example, concatenating a hash generated from a second value of the key-value pair 195 with a first value of the key-value pair 195.

In some aspects of the technical solutions described herein, the input feature encoding is provided as input to the query determiner 140 to generate the predicted requests 165. For example, the label generator 145 generates the input feature encoding by generating a hash for each second value of the key-value pairs and concatenating the hash with a first value of its respective key-value pair 195. The label generator 145 provides the input feature encoding to the query determiner 140 to provide as input to the models 175. The query determiner 140 generates the predicted requests 165 using the input feature encoding as input to the model 175.

The computing system 105 includes a retrieval identifier 150 designed, constructed, and operational to identify a set of predicted requests from the predicted requests 165. The retrieval identifier 150 is any combination of hardware and software for identifying a subset of the predicted requests 165 as being above a threshold metric. For example, the retrieval identifier 150 determines, based on the predicted requests 165, a metric for each of the predicted requests 165 and identifies each predicted request which is at or above the threshold metric.

The retrieval identifier 150 generates, determines, or calculates a metric for each of the predicted requests 165. In some aspects of the technical solutions described herein, the metric includes a latency associated with each of the predicted requests 165. The latency includes a period of time to retrieve the data 180 indicated in each of the predicted requests 165 from the database 110, a period of time to access the database 110 to retrieve the data 180 indicated in each of the predicted requests 165, a delay between transmitting a request for the data 180 indicated in the predicted request 165 and receiving the data 180, among others. The retrieval identifier 150 identifies the latency associated with each of the predicted requests 165. The retrieval identifier 150 determines the latency for each of the predicted requests 165 by identifying the size of the data 180 indicated in each predicted request. In some aspects of the technical solutions described herein, a larger data size indicates a higher latency, due to transmitting more data packets over the network 101. The retrieval identifier 150 determines the latency for each of the predicted requests 165 by identifying a traceroute associated with the predicted requests 165. For example, the retrieval identifier 150 determines, based on the received requests 120 from the client 125, a traceroute between the client 125, the computing system 105, and the database 110. Based on the traceroute, the retrieval identifier 150 calculates, estimates, or otherwise determines a latency for each of the predicted requests 165. The retrieval identifier 150 determines the latency for each of the predicted requests 165 by identifying a speed of the network 101 between the database 110, the computing system 105, or the client 125. In some embodiments, the retrieval identifier 150 performs a ping operation to determine a round trip time between the computing system 105 and the database 110 or the client 125. The latency can be based on a combination of the one or more factors described.

In some aspects of the technical solutions described herein, the metric includes a frequency associated with each of the predicted requests 165. The frequency can refer to the occurrences of a set of first predicted requests 165A or components of the set of first predicted requests 165A compared to the entirety of the predicted requests 165. The retrieval identifier 150 determines the frequency associated with each of the predicted requests 165. In some aspects of the technical solutions described herein, the frequency includes a frequency of the data 180 indicated in each of the predicted requests 165. For example, a first set of the predicted requests 165A indicates a first data 180A and a second set of the predicted requests 165B indicates a second data 180B. The second set of the predicted requests 165B can be smaller (e.g., include less predicted requests 165) than the first set of the predicted requests 165A. In this illustrative example, the first set of the predicted requests 165A would be more frequent (e.g., have a higher frequency) than the second set of the predicted requests 165B. The frequency can refer to a frequency of key-value pairs of the predicted requests 165. For example, a first set of the predicted requests 165A shares one or more values of key-value pairs and a second set of the predicted requests 165B shares one or more different values of key-value pairs. The first set of the predicted requests 165A includes more predicted requests 165 than the second set of the predicted requests 165B, thereby indicating the first set of the predicted requests 165A is more frequent than the second set of the predicted requests 165B. The frequency can be based on a combination of the one or more factors described.

The retrieval identifier 150 generates the metric from the frequency and the latency. In some aspects of the technical solutions described herein, the retrieval identifier 150 generates a metric for each predicted request of the predicted requests 165 by performing an operation on the frequency and latency associated or identified for each predicted request 165. For example, the retrieval identifier 150 generates each metric based on a product of the frequency and latency of each predicted request 165. For example, the retrieval identifier 150 generates each metric based on a summation of the frequency and latency of each predicted request 165.

In some aspects of the technical solutions described herein, the metric indicates a likelihood that a subsequent client request 120 corresponds to the predicted request associated with the label. For example, consider a first predicted request 165A with a first value of a metric, and a second predicted request 165B with a second value of the metric, the first value being higher than the second value. It may be deemed that the first predicted request 165A with the higher value is more likely to correspond to a subsequent client request 120. In some aspects of the technical solutions described herein, the metric can be a bandwidth or computational power associated with the retrieval of the data 180 indicated in each predicted request 165. For example, the higher first value of the first predicted request 165A indicates that executing the first predicted request 165A to retrieve the data would consume more computational power or bandwidth than retrieving the data associated with the second predicted request 165B.

The retrieval identifier 150 identifies the subset of the predicted requests 165 based on a threshold. In some aspects, the retrieval identifier 150 identifies that the metric is below, at, or above a threshold associated with the metric. In some aspects of the technical solutions described herein, the retrieval identifier 150 determines that a metric associated with a product of latency and frequency of each of the predicted requests is above a threshold metric. In some aspects, the retrieval identifier 150 determines to include predicted requests 165 above the threshold metric within the subset of the predicted requests 165. For example, the retrieval identifier 150 determines, for each request of the predicted requests 165, the metric associated with a product of latency and frequency and can include the a predicted request 165 of the predicted requests 165 in the subset of the predicted requests 165 if the metric is above a threshold metric associated with latency and frequency.

In some aspects of the technical solutions described herein, the retrieval identifier 150 ranks the predicted requests 165 based on each respective metric of the predicted requests 165. The retrieval identifier 150 determines an incrementing rank or a decrementing rank. In some aspects of the technical solutions described herein, the retrieval identifier 150 selects the subset of the predicted requests 165 based on the ranking. For example, the retrieval identifier 150 selects the subset of the predicted requests 165 based on the highest ranked, lowest ranked, or median ranked metrics corresponding to the predicted requests 165. In some aspects, the retrieval identifier 150 selects a number of the predicted requests 165 according to the ranking for inclusion in the subset of the predicted requests 165. For example, the retrieval identifier 165 includes in the subset the five predicted requests 165 associated with the highest metric, the two predicted requests 165 associated with the lowest metric, or the three predicted requests 165 associated with the median metrics.

The retrieval identifier 150 determines an order or rate at which to retrieve data associated with the subset of the predicted requests 165 from the database 180. In some aspects of the technical solutions described herein, the retrieval identifier 150 determines an order of retrieval based on the metrics associated with each predicted requests 165 of the subset. For example, the retrieval identifier 150 determines an order of retrieval based on the ranking of the metrics. The order can indicate a sequence of data calls, requests, or retrievals of the data 180 from the database 110. In some aspects of the technical solutions described herein, the order indicates more than one data for retrieval at a time. For example, a first data 180A and a second data 180B are indicated to be retrieved first in the order. In some aspects of the technical solutions described herein, a first data 180A indicated in the order as to be retrieved first corresponds to a predicted request 165 with a highest metric. For example, the retrieval identifier 150 determines to retrieve the data associated with the predicted request 165 with a highest metric corresponding to a product of latency and frequency.

In some aspects of the technical solutions described herein, the retrieval identifier 150 determines the order of retrieval across a multitude of predicted requests 165 for a multitude of clients 125. For example, a first client 125 is associated with a first subset of the predicted requests 165A and a second client 125B is associated with a second subset of the predicted requests 165B. The retrieval identifier 150 generates an order associated with the first 165A and the second 165B subset of the predicted requests. In this manner, in some aspects the retrieval identifier schedules a multitude of requests from different clients 125 to the same database 110 based on the metrics associated with each of the predicted requests 165 to reduce network traffic and congestion within the system 100. The retrieval identifier 150 provides instructions indicating the order of the retrieval of the data 180 associated with the subsets of predicted requests 165 to the data handler 155.

The computing system 105 includes a data handler 155 designed, constructed, and operational to retrieve, receive, identify, obtain, or otherwise access the data 180. The data handler 155 is any combination of hardware and software for collecting, storing, processing, identifying or receiving information or data of the data 180 from the database 110. For example, the data handler 155 accepts the data 180 transmitted from the database 110. The data handler 155 retrieves, queries, aggregates, or otherwise obtains the data 180 from the database 110. The data handler 155 receives the data 180 from the database 110 via the network 101, a non-transitory computer-readable medium (e.g., a flash drive, CD-ROM, external hard drive, or other such physical data transfer medium), or via user inputs to the computing system 105 via a user interface associated with the computing system 105, the client device 125, or the database 110.

The data handler 155 retrieves the data 180 from the database 110 based on the instruction from the retrieval identifier 150. The data handler 155 retrieves the data 180 from the database 110 responsive to the retrieval identifier 150 determining the metrics for the predicted requests 165. The data handler 155 retrieves the data 180 based on the order of retrieval indicated in the instruction generated by the retrieval identifier 150 based on the metrics. For example, the data handler 155 retrieves a first data 180A associated with a first predicted request 165A indicated as the first within the order by the retrieval identifier 150 based on a metric including a product of latency and frequency.

The data handler 155 retrieves the data 180 associated with the subset of the predicted requests 165 to store in the cache store 121 coupled with the data repository 115. The data 180 can be associated with a time stamp. In some aspects, the timestamp relates to a time of retrieval of the data 180 by the data handler 155, a time of creation or updating of the data 180 within the database 110, among others. The data handler 155 receives the data as a data stream or real-time data feed. The data handler 155 can ping or poll the database 110 for the data 180. The data handler 155 stores the data 180 in the data repository 115. The data handler 155 accesses and modifies the data repository 115 to store or alter the various data 180 collected. The data handler 155 stores the retrieved data 180 in the cache store 121 in association with the predicted request 165. In some aspects of the technical solutions described herein, the data handler 155 stores the retrieved data 180 in the cache store in association with one or more labels 170 corresponding to the predicted request 165.

The data handler 155 can remove the stored data 180 from the cache store 121. In some aspects of the technical solutions described herein, the data handler 155 can remove the stored data 180 from the cache store 121 upon elapse of a threshold period of time. For example, the data handler 155 removes the stored data 180 from the cache store 121 after ten minutes, one hours, or one day. In some aspects of the technical solutions described herein, the data handler 155 removes the stored data 180 from the cache store 121 upon the computing system 105 receiving a new or subsequent client request 120. For example, the data handler 155 deletes the stored data 180 from the cache store 121 upon the receipt of the subsequent client request 120, upon the query determiner 140 determining a second set of predicted requests based on the subsequent request 120, or based on a determination of a second subset of the predicted requests based on the subsequent client request 120. In some aspects of the technical solutions described herein, the data handler 155 removes a subset of the stored data 180. For example, the data handler 155 removes a subset of the stored data 180, responsive to receiving the subsequent request 120, that does not correspond to the subsequent request 120. In some aspects of the technical solutions described herein, the data handler 155 removes the data 180 from the cache store 121 upon a termination of the session by the client device 125, or upon a termination of the application 130 operating on the client 125.

In some aspects of the technical solutions described herein, removing the stored data 180 from the cache store 121 refers to the data handler 155 deleting the data from the cache store 121. In some aspects of the technical solutions described herein, removing the stored data 180 from the cache store 121 refers to the data handler 155 moving the stored data 180 or a subset of the stored data 180 from the cache store 121 to another storage or data repository (such as the data repository 115). For example, the data handler 155 transfers the stored data 180 from the cache store to a remote data repository, or another storage not depicted in the FIG. 1.

The data handler 155 stores the data 180 associated with the predicted requests based on a first client request 120A. In some aspects of the technical solutions described herein, the request administrator 135 receives a second client request 120B upon or subsequent to the storage of the data 180 associated with the subset of the predicted requests 165. The data handler 155 determines, based on the labels 170 and the second client request 120B, an association between a predicted request 165A and the second client request 120B.

In some aspects of the technical solutions described herein, if the data handler 155 determines an association between the predicted request 165A and the second client request 120B, the data handler 155 provides the stored data 180 associated with the predicted request 165A to the client 125. In this manner, stored data 180A associated with the predicted request 165A is or includes the data indicated by the second client request 120B. The data handler 155 retrieves the stored data 180A from the cache store for the request administrator 135 to transmit, via the network 101, to the application 130 operating on the client 125.

In some aspects of the technical solutions described herein, the data handler 155 does not determine an association between any of the subset of the predicted requests 165 and the second client request 120B. If the data handler 155 does not determine an association between one or more of the subset of the predicted requests 165 and the second client request 120B, the data handler 155 queries, accesses, or otherwise retrieves the data indicated in the second client request 120B from the database 110.

In some aspects of the technical solutions described herein, the request administrator 135 generates suggested client requests. The request administrator 135 generates the suggested client requests based on the predicted requests 165. For example, the request administrator 135 generates the suggested requests to include or be like one or more of the predicted requests 165. In some aspects of the technical solutions described herein, the request administrator 135 generates the suggested client requests based on user input. For example, the request administrator 135 determines, based on a partial or complete input to a user interface element such has a data field, drop down menu, text box, or other such user interface element of the client device 125, one or more suggested requests. In some aspects of the technical solutions described herein, the suggested requests include the predicted requests 165. In some aspects of the technical solutions described herein, the suggested requests correspond to the label 170. For example, the request administrator 135 generates a suggested request based on the labels 170 generated by the label generator 145. In some aspects of the technical solutions described herein, the request administrator 135 can generate a suggested request based on the input feature encoding determined by the label generator 145. For example, one or more suggested client requests conforms to the input feature encoding such that the suggested client requests include a concatenated hash generated by the label generator 145. In some aspects of the technical solutions described herein, the request administrator 135 generates a suggested client request from a listing of suggested client requests. The request administrator 135 can determine that a user input corresponds to one or more suggested client requests of the listing of suggested client requests based on a length of the user input, characters of the user input, or other characteristics of the user input. For example, the request administrator 135 maintains a list of suggested client requests related to names. The request administrator 135 determines, based on the user input, one or more suggested client requests from the list of suggested client requests. The user input corresponds to the suggested client request if the user input includes a typo of the suggested request, an abbreviation of the suggested request, or a synonym of the suggested request, among others. For example, the request administrator 135 determines that the user input "Mike Smith" corresponds to a suggested client request of "Michael Smith." For example, the request administrator 135 determines that the user input "Darah Jones" corresponds to a suggested client request of "Sarah Jones." For example, the request administrator 135 determines that the user input "price," corresponds to a suggested client request including "cost."

In some aspects of the technical solutions described herein, the request administrator 135 develops a listing of suggested requests using a classifier. The request administrator 135 can use one or more of the models 175 to determine the listing of suggested requests. In some aspects of the technical solutions described herein, the request administrator 135 uses the model 175 to determine common or frequent words or phrases of the predicted requests 135, prior client requests 120, or the data 180 to generate the listing of suggested requests. For example, the request administrator 135 determines related words or phrases and select a word or phrase of the related words and phrases for incorporation in the listing of suggested requests.

The request administrator 135 displays the suggested client requests to a user via the application 130 executing on the client device 125 request. In some aspects of the technical solutions described herein, the request administrator 135 displays the suggested client request to prompt the user to make a selection of one or more of the suggested requests as a next or subsequent client request 120. A user can provide user input via a user interface presented by the application 130 on the client device 125. The user can interact with one or more user elements to make a selection based on the presented suggested client requests. Upon a selection of one or more of the suggested client requests, the client device 125 transmits the selected suggested client request as a subsequent client request 120.

The request administrator 135 identifies that the predicted requests 165 have a marker. In some aspects of the technical solutions described herein, the marker indicates that one or more of the predicted requests 165 were marked as cacheable. One or more of the predicted requests 165 are marked as cacheable by an operator of the system 100 or by the database 110. In some implementations, a first predicted request 165A is marked or indicated as not cacheable if the database 110 or an operator of the database 110 indicates that a first data 180A indicated in the first predicted request 165A is not to be cached. In this illustrative example, the data handler 155 cannot retrieve the first data 180A associated with the first predicted request 165A if the first data is indicated as not cacheable. In some aspects of the technical solutions described herein, the model trainer 160 cannot train one or more of the models 175 upon a determination that one or more of the predicted request 165 were marked as not cacheable.

The computing system 105 includes model trainer 160 designed, constructed and operational to train, maintain, identify, or operate the models 175. The model trainer 160 trains the models 175 using one or more of the client requests 120, the data 180, the user input, or a combination thereof. The model trainer 160 maintains, updates, or retrains the models 175. The model trainer 160 identifies the models 175 for use by other subcomponents of the computing system 105. The model trainer 160 stores or modifies the models 175 in the data repository 115.

The model trainer 160 trains the models 175. The model trainer 160 establishes or generates the models 175 using a training data set including at least one of the client requests 120 received prior to the session, the user profiles 185, user annotations, the input feature encoding, the labels 175, among others. The model trainer 160 uses the training data set constructed from data acquired from or associated with a multitude of client devices, such as the client device 125B-125N, to train the models 175 for use with the client device 125A. For example, the model trainer 160 trains the models 175 using data associated with the user profiles 185 associated with other clients 125B-125N, using data associated with the client requests 120 from sessions initiated on the other clients 125B-125N, among other data. In some embodiments, the model trainer 160 trains the models 175 using a training set constructed from data associated with the client device 125A during prior sessions.

In some embodiments, the user profiles 185 can be associated with one or more entities. The entities can be organizations, companies, non-profits, institutions, or other such organizations involving one or more employees, personnel, or computing devices. In some aspects of the technical solutions described herein, the user profiles 185 are associated with an entity through the client device 125 owned by, operated for, or used for the entity, such as performing routines, operations, or tasks associated with an employee of the entity. For example, a first subset of the user profiles 185A is associated with a first entity and a second subset of the user profiles 185B is associated with a second entity. In some aspects of the technical solutions described herein, the model trainer 160 trains the models 175 using the user profiles 185 of the one or more entities. In this manner, the models 175 can be trained across a large data set by incorporating data associated with multiple entities, although the models 175 can operate for client devices 125 associated with one entity or less entities that the entire set of multiple entities.

The model trainer 160 trains one or more of the models 175 to capture a temporal pattern of the user profiles 185. In some aspects of the technical solutions described herein, one or more of the models is trained to identify requested profiles of the user profiles 185 based on historical client requests 120. The computing system 105 determines, using the model 175, a temporal pattern of the user profiles 185 to identify the requested profiles. For example, the computing system 105 determines, based on prior client requests 120 across the system 100, the requested profiles as a subset of the user profiles 185 that submit one or more client requests 120 at a similar frequency or time of day based on the prior client requests 120. In some aspects of the technical solutions described herein, the computing system 105 determines, based on prior client requests 120 across the system 100, the requested profiles as a subset of the user profiles 185 that submit one or more client requests 120 corresponding to a label 175, data 180, or other common feature. In some aspects of the technical solutions described herein, the computing system 105 determines the requested profiles according to an entity associated with the requesting profiles. For example, the requested profiles can correspond to or be included within an entity of a set of entities. In some aspects of the technical solutions described herein, the computing system 105 an determine the requested profiles across all or a subset of the entities.

The model trainer 160 instructs the data handler 155 or the request administrator 135 to aggregate the training data set to train, generate, or establish the models 175. The model trainer 160 instructs, causes, or pushes the data handler 155 or the request administrator 135 to receive or retrieve the training data set at any time for training the models 175. The model trainer 160 trains the models 175 using the training data set, a subset of the training data set, historical data, input data by a user (e.g., such as annotations by the user from a user annotation tool or interface), or others of the inputs described herein. The model trainer 160 segments, subsects, divides, or otherwise creates subsets of the training data set to train the models 175. The model trainer 160 can divide the training data set based on a percentage of information. For example, the model trainer 160 divides the training data set into two subsets wherein the first subset can include 30% of the digital information in GB and the second subset includes 70% of the information in GB. The model trainer 160 can divide the training data set based on data type, a time received, or user profiles 185 associated with the training data set. The model trainer 160 can divide the training data set into an input training data set and a test data set.

The model trainer 160 feeds, supplements, or provides the input training data set as inputs to the models 175 to train the models 175. The inputs are or include the inputs as described herein in addition to the input training data set. The model trainer 160 uses the input training data set to train the models 175 based on known outputs of the input training data set. The input training data set can be annotated by a user or otherwise have known outputs or outcomes. By providing the input training data set with the inputs and known outputs to the models 175, the model trainer 160 generates the trained models 175. For example, the input training data set includes a large variety of data types, client requests 120, user profiles 185, among others. The input training data set can be marked to distinguish each attribute of the input training data set. The model trainer 160 generates the trained models 175 by providing the inputs to create the known outputs. This process can be iterative and can utilize any of the inputs or machine learning models described herein.

The model trainer 160 validates the trained models 175 using the test data set. With generation of the models 175, the model trainer 160 provides inputs based on the test data set to determine a validity of each of the models 175. The validity of each of the models 175 can relate to an error. The error is the difference between the known outcomes of the test data set and actual outcomes when inputs based on the test data set are provided to the models 175. For example, the test data set includes a known input and outcome. Upon providing the known input to a model trained to accept that input, the model 175 provides the known outcome, or can provide a different, erroneous outcome. This comparison between the known outcome and the model-generated outcome can be repeated for various inputs of a model 175 to generate an overall error score or rate. The error score or rate relates to the validity of the model. If the error score or rate for the model 175 exceeds a threshold error, the model is considered invalid or erroneous. If the error score or rate for the model 175 is at or below the threshold error, the model 175 is considered valid. In this manner, each model 175 is validated.

The model trainer 160 retrains the models 175. The model trainer 160 can retrain the models 175 responsive to the error score of the one or more models 175 being above a threshold error. In some cases, the model trainer 160 determines that the error score of the models 175 is above the threshold error (e.g., invalid) responsive to generation of the models 175 by the model trainer 160. For example, the model trainer 160 determines that a model 175A of the models 175 is invalid based on an error score of the model 175A exceeding an error threshold for the model 175A upon generation. The model trainer 160 determines that the models 175 are invalid prior to storing the models 175 in the data repository 115. The model trainer 160 can check the models 175 periodically to determine validity of the models 175. For example, a model 175A which was once valid can drift, or become less valid or have a higher error score over time. The model trainer 160 determines that the models 175 are invalid or above a threshold error at any time. The model trainer 160 checks the validity of the models 175 stored in the data repository 115, the models 175 generated by the model trainer 160, or other models 175 of the system 100.

Upon the model trainer 160 determining that one or more models 175 are invalid (e.g., the error score is above the threshold error), the model trainer 160 instructs the data handler 155 or the request administrator 135 to aggregate, collect, or retrieve a second training data set. With receipt of the second training data set, the model trainer 160 retrains the models 175. The model trainer 160 divides the second training data set into subsets, such as a second training input data and a second test data. The model trainer 160 combines the training data set and the second training data set. For example, the model trainer 160 incorporates, combines, or adds the second training data to the training data. With the aggregation of the second training data set, the model trainer 160 provides further inputs and known outcomes to further train the models 175. The model trainer 160 retrains the models 175 with an error score above the threshold error, all of the models 175, or selected models 175. The model trainer 160 can train the models 175 or a subset of the models 175 subsequent to the elapse of a period of time. For example, the model trainer 160 retrains a model 175A every week, a model 175B every year, a model 175C upon its error score exceeding the threshold error for the model 175C, or never retrains a model 175D.

The model trainer 160 checks the retrained models 175 for validity. The model trainer 160 checks or tests the retrained models 175 as described herein, by comparing an error score of each model 175 with a threshold error for each model 175. Upon the model trainer 160 determining that one or more of the retrained models 175 are invalid, the model trainer 160 aggregates a third training data set and repeats the retraining process. The retraining process can be repeated until the error score of the model 175 is below the threshold error. The model trainer 160 can issue an alert or notification if the model 175 fails testing or retraining a threshold number of times.

Upon the model trainer 160 determining that the retrained models 175 or the trained models 175 are valid, the model trainer 160 stores the models 175 in the data repository 115. In some cases, the model trainer 160 replaces a first model 175A with a retrained model 175B. The model trainer 160 replaces the first model 175A with the retrained model 175B based on user input, or based on the first model 175A having an error score above the threshold. In this manner, models 175 which have drifted, become erroneous, or no longer represent the data set 165 are replaced by the model trainer 160 to ensure validity of the system 100.

The model trainer 160 generates and validates the models 175 in parallel, series, or a combination thereof. For example, the model trainer 160 generates, validates, or stores a first model 175A concurrently with a second model 175B. The model trainer 160 generates, validates, or stores a first model 175A prior to the generation of a second model 175B. In some aspects of the technical solutions described herein, a subsequent model uses as input an outcome of a prior model. In these aspects of the technical solutions described herein, the model trainer 160 generates, validates, or stores the subsequent model after the prior model.

The operations of the computing system 105 are performed for each subsequent request of the client requests 120. In some aspects of the technical solutions described herein, upon the receipt of a new or subsequent client request 120, the computing system 105 performs the functions depicted herein to generate the predicted requests 165 for each subsequent client request 120. For example, the request administrator 135 receives a third client request 120C and determines, based on the first client request 120A and the second client request 120B, the predicted requests 165. In this manner, the system 100 autoregressively determines predicted requests 165 and retrieves associated data 180 for storage in the cache store as further client requests 120 are received. The technical solutions described herein are able to increase efficiency of data retrieval between different systems compared to previous predictive caching systems. Furthermore, the technical solutions described herein reduce computational power required for retrieving data from a remote database.

Figure 2:
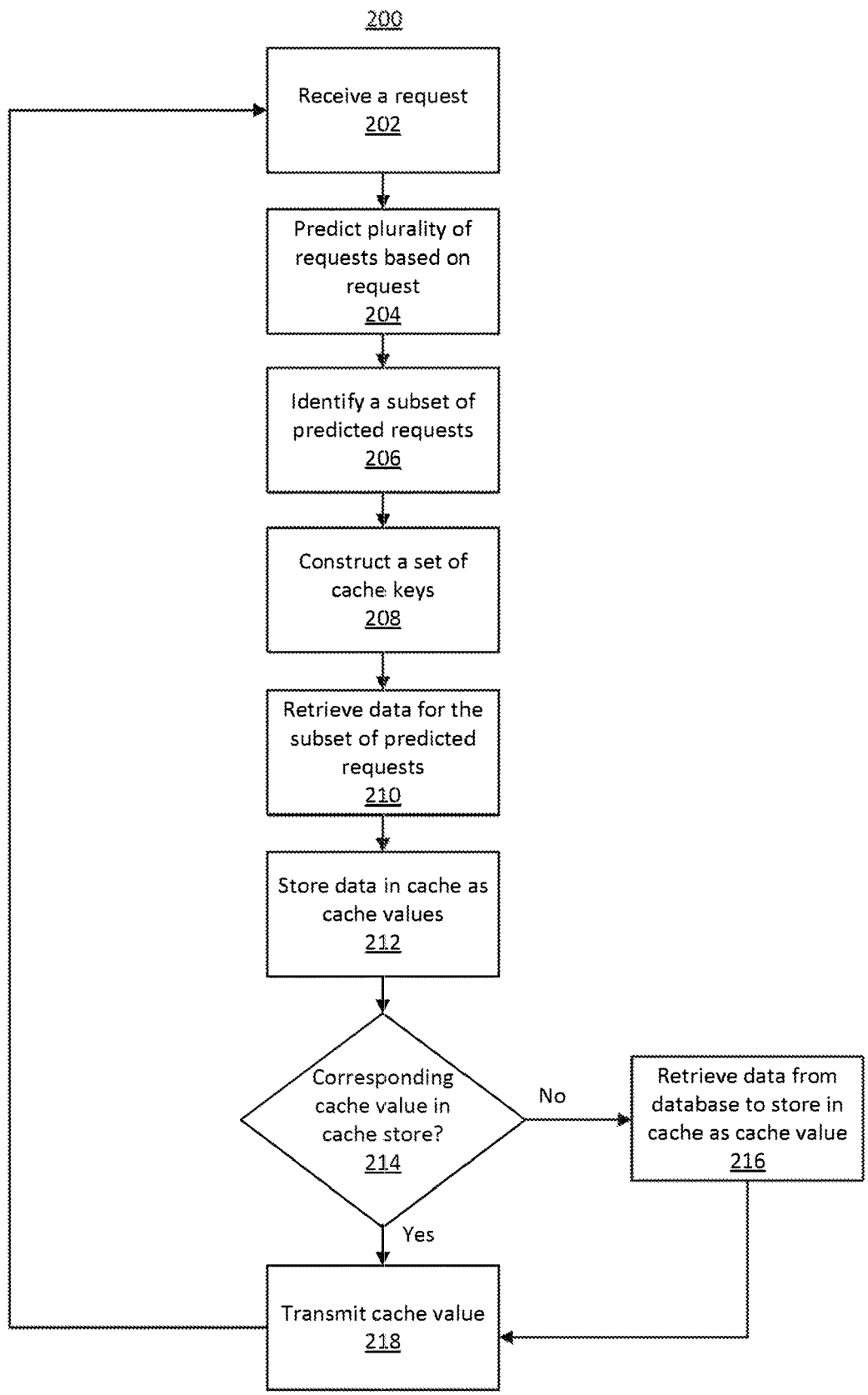
FIG. 2 depicts an example method for iteratively predicting cacheable queries.

FIG. 2 depicts an example method 200 for predicting cacheable queries according to one or more aspects of the technical solutions described herein. The method 200 is performed by one or more systems or components depicted in FIG. 1, FIG. 6, or FIG. 7, including, for example, a data processing system. At ACT 202, the method 200 includes the computing system receiving a request. The request can be or include the client requests 120 of FIG. 1. The request includes or identifies a set of key-value pairs, an identifier, or both, among others. The request is received by the computing system via a client service, such as an application operating on a client device.

At ACT 204, the computing system predicts a plurality of requests based on the received request. In some cases, the computing system utilizes a trained machine learning model to generate the plurality of requests. The plurality of requests is or includes a plurality of predicted requests, such as the predicted requests 165 of FIG. 1. In some cases, the computing system predicts the plurality of requests based on the identifier and the key-value pairs of the received request. The computing system generates a hash from each of the set of key-value pairs according to a predefined hash function. The computing system concatenates each hash with a value of the key-value pairs to generate input feature encoding. The computing system identifies the plurality of requests by identifying requests associated with the input feature encoding.

At ACT 206, the computing system identifies a subset of predicted requests. In some aspects, the computing system identifies the subset of predicted requests subsequent to or concurrently with the prediction of the plurality of requests. In some aspects, the computing system identifies a subset of predicted requests using the machine learning model and based on a comparison with a threshold metric. The threshold metric includes a metric based on a latency and frequency of predicted requests. Each predicted request of the subset of predicted requests satisfies the threshold metric. For example, the computing system identifies a predicted request as belonging to the subset of predicted requests based on a product of latency and frequency of a predicted request of the plurality of requests being at or below a threshold metric corresponding to a product of latency and frequency.

The subset of predicted requests indicates one or more subsequent requests. For example, the subset of predicted requests includes one or more possible subsequent requests received from the client device. The subset of predicted requests includes predicted request identifiers and corresponding predicted key-value pairs. Each predicted request of the subset of predicted requests includes predicted request identifiers and corresponding predicted key-value pairs.

At ACT 208, the computing system constructs a set of cache keys. In some aspects, the computing system constructs the set of cache keys upon identifying the subset of predicted requests. The set of cache keys is or includes labels, such as the labels 170 of FIG. 1. The computing system generates the set of cache keys via the machine learning model and based on the predicted request identifiers and the corresponding predicted key-value pairs. In some cases, the machine learning model takes as input the predicted request identifies and the corresponding predicted key-value pairs to generate the labels for the subset of predicted requests.

At ACT 210, the computing system retrieves data for the subset of predicted requests. In some aspects, the computing system retrieves the data including cache keys from a database remote from the client device. The computing system retrieves the data based on the constructed labels. For example, the computing system retrieves the data corresponding to the set of labels from a remote database. The computing system retrieves the data according to a schedule. In some cases, the computing system retrieves the data according to a schedule to reduce network congestion associated with the retrieval of the data from the remote database. For example, the computing system retrieves the data according a scheduled responsive to determining that the subset of predicted requests exceeds a rate threshold.

ACT 212, the computing system stores the data in a cache as cache values. In some aspects, the computing system configures or marks the data as cache values upon storage in the cache store. In some aspects, the computing system can retrieve the data as cache values from the remote database. As subsequent requests are received, the computing system stores subsequent predicted requests with corresponding cache values in the cache store. The computing system associates with each predicted request and corresponding cache value, a period of time. The period of time can include a time to live (TTL) or other such period of time upon the elapse of which the associated predicted request and corresponding cache value is removed from the cache store. In this manner, the system iteratively stores cache values related to predicted requests for quick retrieval upon receipt of subsequent requests, as well as delete or remove cache values which can no longer be relevant due to the elapse of the period of time.

At decision block 214, the computing system determines if a cache value corresponding to the received request is in the cache store. The computing system determines if one or more cache values corresponds to the received request by identifying if a predicted request matches the received request. Upon a determination that a corresponding cache value is not stored in the cache store, the computing system retrieves data from the remote database to store in the cache as a cache value (ACT 216).

Upon a determination that a corresponding cache value is in the cache store, the computing system transmits the cache value (ACT 218). The computing system transmits the cache value to a requesting client device, such as the client device 125 of FIG. 1. Transmitting the cache value includes displaying the cache value on a user interface of the client device. For example, transmitting the cache value includes generating instructions to display the cache value on a screen or other user interface of the client device.

Figure 3:
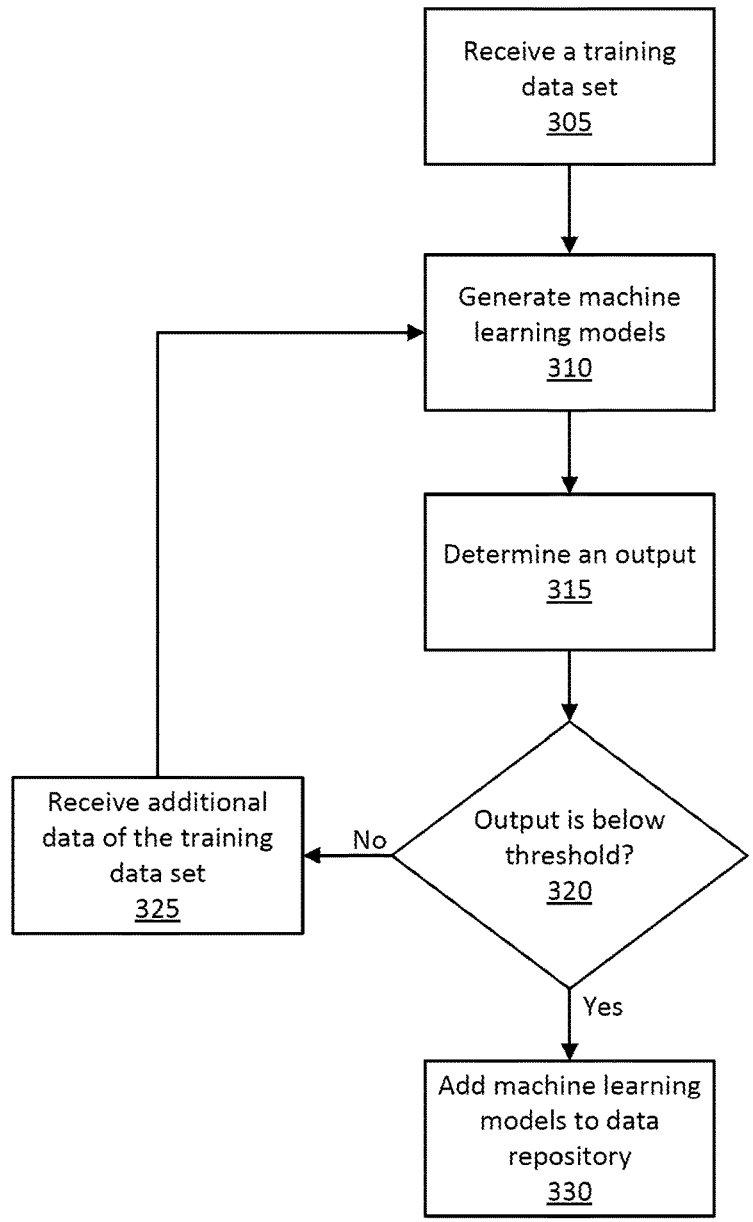
FIG. 3 depicts an example method for training a machine learning model.

FIG. 3 depicts a method 300 for training machine learning models for predicting cacheable queries according to one or more aspects of the technical solutions described herein. The method 300 is performed by one or more systems or components depicted in FIG. 1, FIG. 6, or FIG. 7, including, for example, a computing system. At ACT 305, the computing system receives a training data set. The computing system receives a training data set from a remote database (e.g., the database 110), one or more client devices (e.g., the client devices 125), or other sources. The training data set includes one or more client requests, one or more data, or one or more user profiles, among others. The computing system divides the training data set into one or more subsets. The computing system divides the training data set into a set of test data and a set of input training data.

At ACT 310, the computing system generates machine learning models. The computing system generates the machine learning models (e.g., the models 175) by training one or more machine learning models using a subset of the training data set. For example, the computing system uses the training data set as inputs for one or more of the machine learning models. The machine learning models can be trained on different subsets of the training data set. The computing system stores the trained ensembles in memory.

At ACT 315, the computing system determines an output. The computing system determines an output (e.g., outcome) of the machine learning models. In some aspects, the computing system determines the output responsive to generating the machine learning models. The computing system determines an output of the ensembles or models using the training data set. For example, the computing system provides the test data as input to the machine learning models. The output of the models is determined from the inputs (e.g., the test data) provided to the models. The models generate or create outputs based at least on the training data. The models generate or create one or more outputs. In some aspects, a model generates an output based on an output of another model. In some aspects of the technical solutions described herein, the outputs include labels (e.g., the labels 170), predicted requests (e.g., the predicted request 165) or a subset of the predicted requests, a temporal pattern associated with the user profiles (e.g., the user profiles 185), among others.

At decision block 320, the computing system determines if the output is below a threshold. The computing system compares the outputs to a threshold. In some aspects, the threshold is an error score. The error score indicates a maximum error allowable by one or more of the machine learning models. In some aspects, each model has a different error score. The output being below a threshold refers to an error score of the model or ensemble being below the threshold error score. In some aspects, the error score of the model is determined as a ratio of "correct" outputs (e.g., outputs generated by the model correlating to a known output of the test data) to total outputs, a ratio of "incorrect" outputs (e.g., outputs generated by the model that do not correlate to a known output of the test data), or a mean square error of the outputs, among others. The computing system establishes a threshold error score for the models. If the output of a model exceeds the threshold error score, the computing system proceeds to ACT 325.

At ACT 325, the computing system receives additional data of the training data set. The computing system receives additional data responsive to the output of a model exceeding or equaling the threshold. The computing system prompts, queries, or requests additional data from the database or the client device. The computing system aggregates additional data from the database or the client device over time to create the additional data of the training data set. The additional data of the training data set can be additional data aggregated over a period of time or a new data set. Upon receiving the additional data, the computing system generates the machine learning models using the additional data in ACT 310.

At ACT 330, the computing system adds the models to the data repository. In some aspects, the computing system adds the machine learning models to the data repository responsive to the output of the models being below the threshold. In some cases, the computing system adds some models which are below the threshold and does not add some models which are not below the threshold. Adding the models to the data repository includes updating a set of existing models to include the generated models with outputs below the threshold. The models are stored in a memory of the computing system for access by the computing system.

Figure 4:
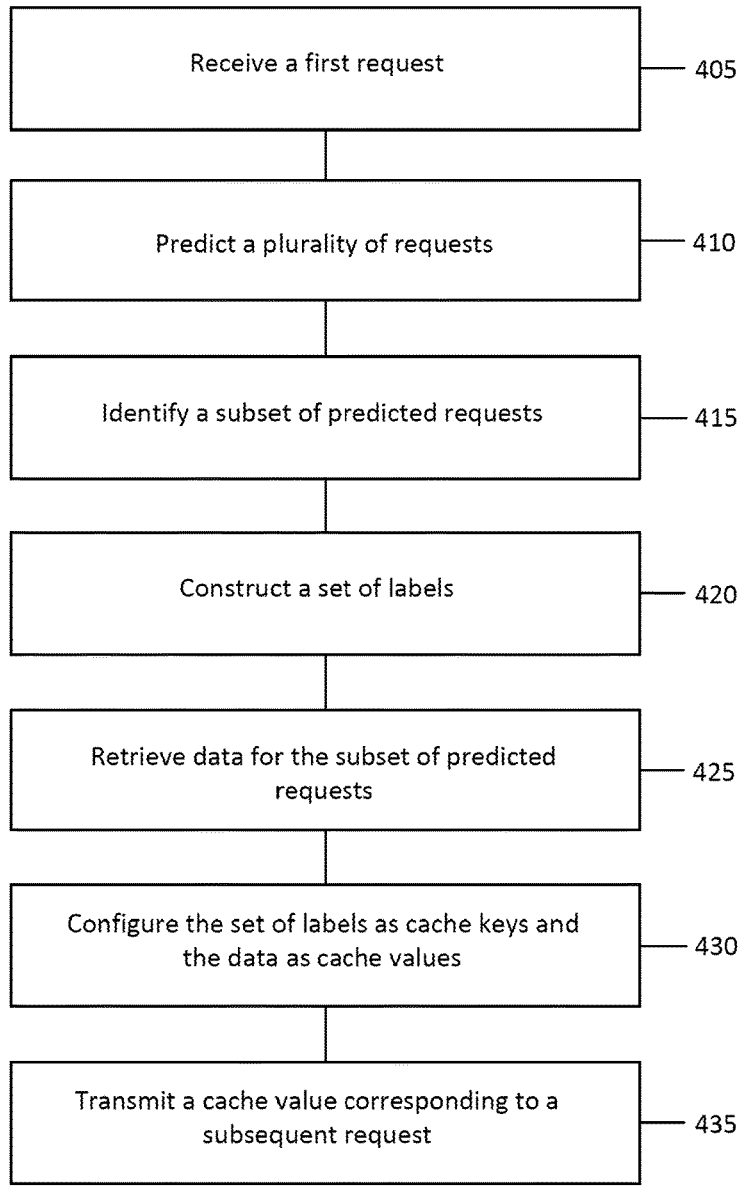
FIG. 4 depicts an example method for predicting cacheable queries.

FIG. 4 depicts a method 400 for example method for predicting cacheable queries according to one or more aspects of the technical solutions described herein. The method includes the acts 405-435. The method 400 is performed by one or more systems or components depicted in FIG. 1, FIG. 6, or FIG. 7, including, for example, a data processing system. At ACT 405, the computing system receives a first request. The first request is for data associated or indicated in the request. The first request includes an identifier and a set of key-value pairs. The data set can be received from one or more client devices.

At ACT 410, the computing system predicts a plurality of requests. The computing system predicts the plurality of requests upon receiving the first request. Predicting a plurality of requests includes predicting a plurality of requests using a machine learning model that takes as input the identifier and the set of key-value pairs from the first request. In some cases, the computing system predicts the plurality of requests based on a set of prior-received requests. For example, the computing system predicts the plurality of requests using a set of requests comprising the first request as well as other requests received with or prior to the receipt of the first request. The plurality of requests is or includes requests indicative of subsequent requests.

At ACT 415, the computing system identifies a subset of predicted requests. In some aspects, the computing system identifies the subset of predicted requests upon predicting the plurality of requests. In some cases, the computing system identifies the subset of predicted requests from the plurality of predicted requests. The computing system identifies the subset of predicted requests based on a comparison with a threshold metric. In some aspects, the threshold metric is or includes a threshold metric based on a latency and frequency associated with data retrievals from a remote database. The subset of predicted requests includes predicted request identifiers and corresponding predicted key-value pairs.

At ACT 420, the computing system constructs a set of labels. In some aspects, the computing system constructs the set of labels upon identifying the subset of predicted requests. The computing system constructs the set of labels using the predicted request identifiers and the corresponding predicted key-value pairs. For example, the machine learning model takes as inputs the predicted request identifiers and the corresponding predicted key-value pairs to generate a set of labels. The set of labels is or includes cache keys.

At ACT 425, the computing system retrieves data for the subset of requests. The computing system retrieves the data for the subset of requests upon constructing the set of labels. The computing system retrieves the data for the subset of requests from a database remote from the computing system or the client device. The computing system retrieves the data as cache keys to store in a cache store. At ACT 430, the computing system configures the set of labels as cache keys. The computing system configures the set of labels as cache keys upon or concurrently with retrieving the data for the subset of requests. The computing system configures the set of labels as cache keys by storing the labels in a cache store. In configuring the set of labels as cache keys, the computing system configures the data retrieved for the subset of predicted requests as cache values.

At ACT 435, the computing system transmits a cache value corresponding to a subsequent request. The computing system receives a subsequent request. The subsequent request can be like the first request. In some aspects of the technical solutions described herein, the subsequent request is received from the same client device which transmitted the first request. In some aspects of the technical solutions described herein, the subsequent request can be received from a different client device than that which transmitted the first request.

In some cases, upon receiving a subsequent request, the computing system predicts a second plurality of requests related to the subsequent request. The computing system stores a second subset of predicted requests and retrieved second corresponding data for the second subset of predicted requests in the cache store with the predicted requests and corresponding cache associated with the first request.

Transmitting a cache value corresponding to the subsequent request includes identifying, in the cache store, a value corresponding to the subsequent request. In some cases, a value corresponding to the subsequent request is not be within the cache store. If the computing system does not identify a value corresponding to the subsequent request within the cache store, the computing system retrieves the value from the database remote from the computing system. Upon retrieving the value from the database remote from the computing system, the computing system stores the newly retrieved value in the cache store. In some cases, transmitting the cache value corresponding to the subsequent request includes generating and transmitting instructions for presenting the cache value. The computing system generates instructions to render the cache value corresponding to the subsequent request for presentation on a display device associated with the client device which transmitted the subsequent request.

Figure 5:
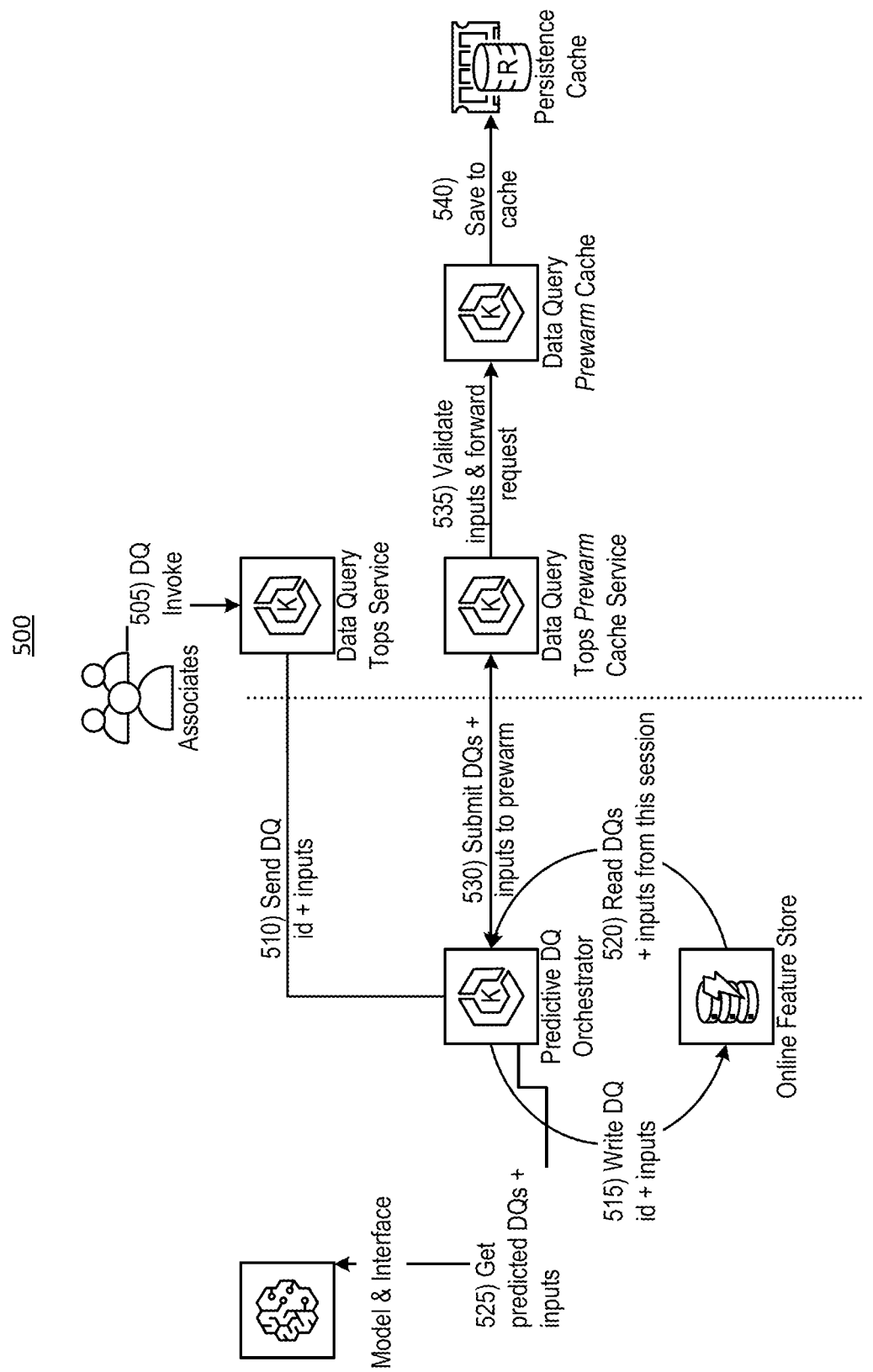
FIG. 5 depicts an example method for predicting cacheable queries.

FIG. 5 depicts a method 500 for predicting cacheable queries. The method 500 is performed by one or more systems or components depicted in FIG. 1, FIG. 6, or FIG. 7, including, for example, a computing system, client device, or database. At ACT 505, the client device receives a DQ invoke. A DQ invoke includes or refers to a data query invoke and can be or include a client request. The client device receives the DQ invoke including a DQ id and inputs. The DQ id and inputs can be or correspond to a key-value pair. At ACT 510, the client transmits the DQ invoke including the DQ id and inputs to the computing system. The computing system includes a predictive DQ orchestrator. In some aspects of the technical solutions described herein, the components of the computing system include or perform the functionalities of the predictive DQ orchestrator.

At ACT 515, the computing system writes DQ id and inputs. In some aspects of the technical solutions described herein, writing the DQ id and inputs refers to storing the key-value pairs associated with the client requests in a data repository, such as an online feature store. At ACT 520, the computing system reads DQs and input from the session. In some aspects of the technical solutions described herein, the computing system reads, retrieves, or otherwise accesses client requests (e.g., DQs) and key-value pair (e.g., inputs) from the session from a data repository, such as the online feature store. The ACTS 515 and 520 can occur in parallel, such that a client request can be written to the online feature store before, during, or after a retrieval of the client requests stored in the data repository.

At ACT 525, the computing system predicts, generates, or otherwise determines the predicted requests. The computing system generates the predicted requests by, for example, the systems and methods described in relation to the query determiner 140, label generator 145, or the retrieval identifier 150 of FIG. 1. The computing system gets, generates, or determines the predicted DQs (e.g., the predicted requests) and inputs using one or more machine learning models.

At ACT 530, the computing system submits the DQs and inputs to prewarm. Submitting the DQs and inputs to prewarm includes retrieving data associated with the set of predicted requests for storage in a cache store. At ACT 535, the computing system validates the inputs and forward the request. Validating the inputs and forwarding the request includes determining whether one or more of the predicted requests has been marked as cacheable. Upon a determination that one or more of the predicted requests has been marked as cacheable, the computing system saves the data associated with the cacheable predicted requests to the cache store (ACT 540).

Figure 6:
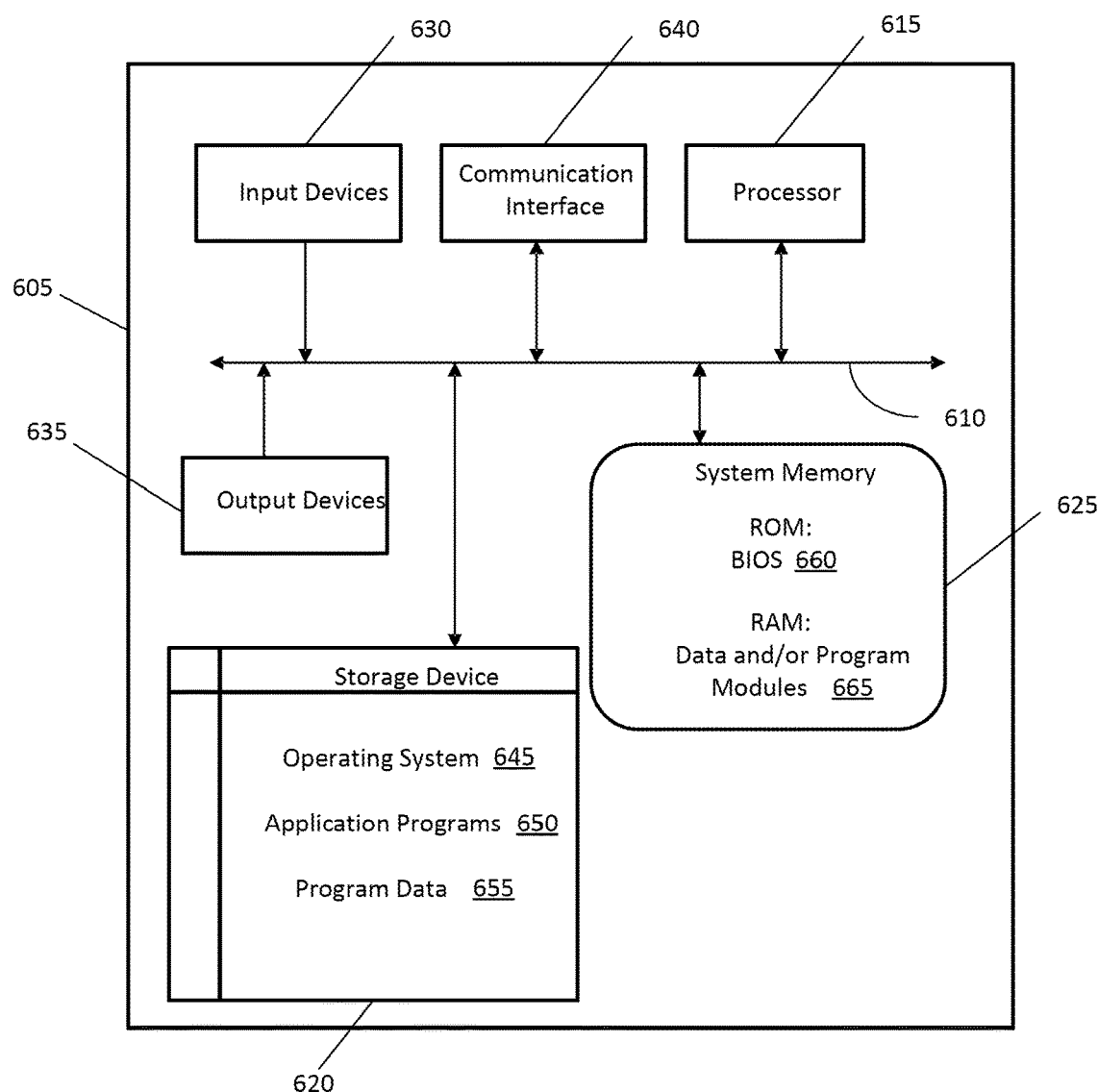
FIG. 6 depicts an illustrative architecture of a computing system implemented in embodiments of the present disclosure.

FIG. 6 is an illustrative architecture of a computing system 600 that implements one or more aspects described herein. The computing system 600 is only one example of a suitable computing system and is not intended to suggest any limitation as to the scope of use or functionality of the disclosure. Also, computing system 600 should not be interpreted as having any dependency or requirement relating to any one or combination of components illustrated in computing system 600.

Figure 7:
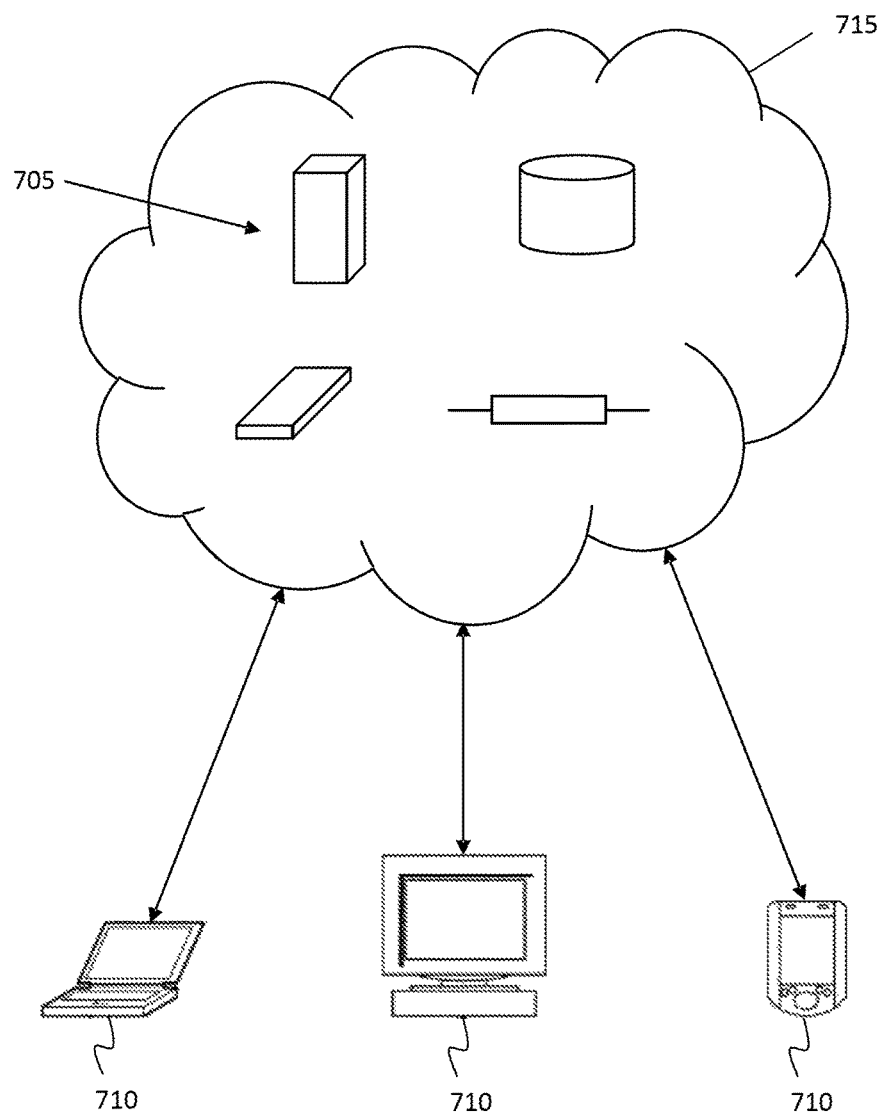
FIG. 7 shows an exemplary cloud computing environment in accordance with aspects of the present disclosure.

As shown in FIG. 6, computing system 600 includes a computing device 605. The computing device 605 can be resident on a network infrastructure such as within a cloud environment as shown in FIG. 7 or can be a separate independent computing device (e.g., a computing device of a third party service provider). The computing device 605 includes a bus 610, a processor 615, a storage device 620, a system memory (hardware device) 625, one or more input devices 630, one or more output devices 635, and a communication interface 640.

The bus 610 permits communication among the components of computing device 605. For example, bus 610 can be any of several types of bus structures including a memory bus or memory controller, a peripheral bus, and a local bus using any of a variety of bus architectures to provide one or more wired or wireless communication links or paths for transferring data and/or power to, from, or between various other components of computing device 605.

The processor 615 is one or more processors or processors that include any processing circuitry operative to interpret and execute computer readable program instructions, such as program instructions for controlling the operation and performance of one or more of the various other components of computing device 605. In aspects of the technical solutions described herein, processor 615 interprets and executes the processes, steps, functions, and/or operations of the present disclosure, which can be operatively implemented by the computer readable program instructions.

For example, processor 615 provides an enterprise-wide security approach with all stakeholders (e.g., Dev teams, leadership, CSO office, etc.) with a set of various security scanner types and information sources integrated into a single tool. In aspects of the technical solutions described herein, the processor 605 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 615 also establishes a regular feedback mechanism and can be used to develop a process for remediation timelines and priority including at risk vulnerabilities. In aspects of the technical solutions described herein, processor 615 receives input signals from one or more input devices 630 and/or drive output signals through one or more output devices 635. The input devices 630 are, for example, a keyboard, touch sensitive user interface (UI), etc. The output devices 635 are, for example, any display device, printer, etc.

The storage device 620 includes removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 605 in accordance with the different aspects of the present disclosure. In aspects of the technical solutions described herein, storage device 620 stores operating system 645, application programs 650, and program data 655 in accordance with aspects of the present disclosure.

The system memory 625 includes one or more storage mediums, including for example, non-transitory media such as flash memory, permanent memory such as read-only memory ("ROM"), semi-permanent memory such as random access memory ("RAM"), any other suitable type of storage component, or any combination thereof. In some aspects of the technical solutions described herein, an input/output system 660 (BIOS) including the basic routines that help to transfer information between the various other components of computing device 605, such as during start-up, can be stored in the ROM. Additionally, data and/or program modules 665, such as at least a portion of operating system 645, application programs 650, and/or program data 655, that are accessible to and/or presently being operated on by processor 615 can be contained in the RAM.

The communication interface 640 includes any transceiver-like mechanism (e.g., a network interface, a network adapter, a modem, or combinations thereof) that enables computing device 605 to communicate with remote devices or systems, such as a mobile device or other computing devices such as, for example, a server in a networked environment, e.g., cloud environment. For example, computing device 605 is connected to remote devices or systems via one or more local area networks (LAN) and/or one or more wide area networks (WAN) using communication interface 640.

As discussed herein, computing system 600 are configured to integrate different scanner types into a single workbench or tool. This allows developers and other team members a uniform approach to assessing security vulnerabilities in a code throughout the enterprise. In particular, computing device 605 performs tasks (e.g., process, steps, methods and/or functionality) in response to processor 615 executing program instructions contained in a computer readable medium, such as system memory 625. The program instructions are read into system memory 625 from another computer readable medium, such as data storage device 620, or from another device via the communication interface 640 or server within or outside of a cloud environment. In aspects of the technical solutions described herein, an operator can interact with computing device 605 via the one or more input devices 630 and/or the one or more output devices 635 to facilitate performance of the tasks and/or realize the end results of such tasks in accordance with aspects of the present disclosure. In additional or alternative aspects, hardwired circuitry is used in place of or in combination with the program instructions to implement the tasks, e.g., steps, methods and/or functionality, consistent with the different aspects of the present disclosure. Thus, the steps, methods and/or functionality disclosed herein is implemented in any combination of hardware circuitry and software.

FIG. 7 shows an exemplary cloud computing environment 700 in accordance with aspects of the disclosure. In aspects of the technical solutions described herein, one or more aspects, functions and/or processes described herein is performed and/or provided via cloud computing environment 700. As depicted in FIG. 7, cloud computing environment 700 includes cloud resources 705 that are made available to client devices 710 via a network 715, such as the Internet. Cloud resources 705 can be on a single network or a distributed network. Cloud resources 705 can be distributed across multiple cloud computing systems and/or individual network enabled computing devices. Cloud resources 705 include a variety of hardware and/or software computing resources, such as servers, databases, storage, networks, applications, and platforms that perform the functions provided herein including storing code, running scanner types and provided an integration of plural scanner types into a uniform and standardized application, e.g., display.

Client devices 710 comprise any suitable type of network-enabled computing device, such as servers, desktop computers, laptop computers, handheld computers (e.g., smartphones, tablet computers), set top boxes, and network-enabled hard drives. Cloud resources 705 are typically provided and maintained by a service provider so that a client does not need to maintain resources on a local client device 710. In aspects of the technical solutions described herein, cloud resources 705 include one or more computing system 600 of FIG. 6 that is specifically adapted to perform one or more of the functions and/or processes described herein.

Cloud computing environment 700 is configured such that cloud resources 705 provide computing resources to client devices 710 through a variety of service models, such as Software as a Service (SaaS), Platforms as a service (PaaS), Infrastructure as a Service (IaaS), and/or any other cloud service models. Cloud resources 705 are configured, in some cases, to provide multiple service models to a client device 710. For example, cloud resources 705 provide both SaaS and IaaS to a client device 710. Cloud resources 705 are configured, in some cases, to provide different service models to different client devices 710. For example, cloud resources 705 provide SaaS to a first client device 710 and PaaS to a second client device 710.

Cloud computing environment 700 is configured such that cloud resources 705 provide computing resources to client devices 710 through a variety of deployment models, such as public, private, community, hybrid, and/or any other cloud deployment model. Cloud resources 705 are configured, in some cases, to support multiple deployment models. For example, cloud resources 705 provide one set of computing resources through a public deployment model and another set of computing resources through a private deployment model.

In aspects of the technical solutions described herein, software and/or hardware that performs one or more of the aspects, functions and/or processes described herein can be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 705 are configured to provide a variety of functionality that involves user interaction. Accordingly, a user interface (UI) is provided for communicating with cloud resources 705 and/or performing tasks associated with cloud resources 705. The UI is accessed via a client device 710 in communication with cloud resources 705. The UI is configured to operate in a variety of client modes, including a fat client mode, a thin client mode, or a hybrid client mode, depending on the storage and processing capabilities of cloud resources 705 and/or client device 710. Therefore, a UI is be implemented as a standalone application operating at the client device in some aspects of the technical solutions described herein. In other aspects, a web browser-based portal is used to provide the UI. Any other configuration to access cloud resources 705 can also be used in various implementations.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes can be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system, comprising:
one or more processors, coupled with a cache store, the one or more processors configured to:
receive a first request that includes an identifier and a set of key-value pairs;
predict, using a machine learning model, a plurality of requests indicative of one or more subsequent requests based on the identifier and the set of key-value pairs from the first request;
identify, using the machine learning model and based on a comparison with a threshold metric, a subset of predicted requests from the plurality of requests, the subset of predicted requests comprising predicted request identifiers and corresponding predicted key-value pairs;
construct, using the machine learning model and based on the predicted request identifiers and the corresponding predicted key-value pairs, a set of labels comprising classifications for the subset of predicted requests;
retrieve, using the set of labels and from a database, data for the subset of predicted requests;
configure, in the cache store, the set of labels as cache keys and the data retrieved for the subset of predicted requests as cache values; and
transmit, responsive to receipt of a subsequent request that matches one of the subset of predicted requests, a cache value from the cache store that corresponds to the subsequent request.

2. The system of claim 1, comprising the one or more processors to:
receive a second request;
predict, responsive to receiving the second request, via the machine learning model, a second plurality of requests based on the first request and the second request;
identify, via the machine learning model and based on a second comparison with the threshold metric, a second subset of predicted requests from the second plurality of requests; and
transmit, responsive to receipt of a second subsequent request that matches one of a group of predicted requests comprising the second subset of predicted requests and one or more of the subset of predicted requests that are below a cache store threshold, a second cache value from the cache store that corresponds to the second subsequent request.

3. The system of claim 1, wherein each of the plurality of requests comprises a metric associated with a latency of the plurality of requests and a frequency of the plurality of requests.

4. The system of claim 1, wherein identifying the subset of predicted requests comprises the one or more processors to:
determine a metric for each of the plurality of requests by calculating a product of a latency associated with each of the plurality of requests and a frequency of receiving each of the plurality of requests;
rank the plurality of requests by respective metrics; and
select the subset of predicted requests based on the ranking.

5. The system of claim 1, comprising the one or more processors to identify that the plurality of requests was marked as cacheable, prior to a training of the machine learning model.

6. The system of claim 1, comprising the one or more processors to remove the cache keys and the cache values from the cache store responsive to an elapse of a threshold period of time.

7. The system of claim 1, wherein predicting the plurality of requests based on the identifier and the set of key-value pairs comprises the one or more processors to:
generate, via the machine learning model, a hash from each of the set of key-value pairs according to a predefined hash function;
concatenate, via the machine learning model, each hash with a value of the set of key-value pairs to generate input feature encoding; and
identify, via the machine learning model, the plurality of requests by identifying requests associated with the input feature encoding.

8. The system of claim 1, comprising the one or more processors to:
determine that a metric associated with the subset of predicted requests exceeds a rate threshold;
generate a schedule of retrieval for the subset of predicted requests; and
retrieve, via the set of labels and from the database remote from a client service, the data for the subset of predicted requests according to the schedule.

9. The system of claim 1, comprising the one or more processors to suggest at least one of the one or more of the subsequent requests by presenting the one or more subsequent requests in an application operating on a client service.

10. The system of claim 1, comprising the one or more processors to train the machine learning model to capture a temporal pattern of requested profiles associated with a client service based on historical data associated with a plurality of profiles from entities, wherein each profile of the requested profiles is one of the plurality of profiles associated with an entity of the entities.

11. The system of claim 1, comprising the one or more processors to predict, via the machine learning model, the plurality of requests based on received requests from a client service during a user session, wherein each received request of the received requests comprises an entity identifier of an entity and a profile associated with the client service, each entity associated with a plurality of profiles comprising a respective profile of each received request.

12. A method, comprising:
receiving, by one or more processors, coupled with a cache store, a first request that includes an identifier and a set of key-value pairs;
predicting, by the one or more processors using a machine learning model, a plurality of requests indicative of one or more subsequent requests based on the identifier and the set of key-value pairs from the first request;
identifying, by the one or more processors using the machine learning model and based on a comparison with a threshold metric, a subset of predicted requests from the plurality of predicted requests, the subset of predicted requests comprising a predicted request identifiers and corresponding predicted key-value pairs;
constructing, by the one or more processors using the machine learning model and based on the predicted request identifiers and the corresponding predicted key-value pairs, a set of labels comprising classifications for the subset of predicted requests;
retrieving, by the one or more processors using the set of labels and from a database, data for the subset of predicted requests;
configuring, by the one or more processors, in the cache store, the set of labels as cache keys and the data retrieved for the subset of predicted requests as cache values; and
transmitting, by the one or more processors, responsive to receipt of a subsequent request that matches one of the subset of predicted requests, a cache value from the cache store that corresponds to the subsequent request.

13. The method of claim 12, comprising:
receiving, by the one or more processors, a second client request;
predicting, by the one or more processors, responsive to receiving the second request, a second plurality of requests based on the first request and the second request;
identifying, by the one or more processors using the machine learning model and based on a second comparison with the threshold metric, a second subset of predicted requests from the second plurality of requests; and
transmitting, by the one or more processors, responsive to receipt of a second subsequent request that matches one of a group comprising the second subset of predicted requests and one or more of the subset of predicted requests that are below a cache store threshold, a second cache value from the cache store that corresponds to the second subsequent request.

14. The method of claim 12, wherein identifying the subset of predicted requests comprises:
determining, by the one or more processors, a metric for each of the plurality of requests by calculating a product of a latency associated with each of the plurality of requests and a frequency of receiving each of the plurality of requests;
ranking, by the one or more processors, the plurality of requests by respective metrics; and
selecting, by the one or more processors, the subset of predicted requests based on the ranking.

15. The method of claim 12, wherein predicting the plurality of requests based on the identifier and the set of key-value pairs comprises:
generating, by the one or more processors, using the machine learning model, a hash from each of the set of key-value pairs according to a predefined hash function;
concatenating, by the one or more processors, using the machine learning model, each hash with a value of the set of key-value pairs to generate input feature encoding; and
identifying, by the one or more processors, using the machine learning model, the plurality of requests by identifying requests associated with the input feature encoding.

16. The method of claim 12, comprising:
determining, by the one or more processors, that a metric associated with the subset of predicted requests exceeds a rate threshold;
generating, by the one or more processors, a schedule of retrieval for the subset of predicted requests; and retrieving, by the one or more processors, the data for the subset of predicted requests according to the schedule.

17. The method of claim 12, comprising training, by the one or more processors, the machine learning model to capture a temporal pattern of requested profiles based on historical data associated with a plurality of profiles from entities, wherein each profile of the requested profiles is one of the plurality of profiles associated with an entity of the entities.

18. The method of claim 12, comprising predicting, by the one or more processors using the machine learning model, the plurality of requests based on received requests during a user session, wherein each received request of the received requests comprises an entity identifier of an entity and a profile associated, each entity associated with a plurality of profiles comprising a respective profile of each received request.

19. A non-transitory computer-readable medium, comprising instructions embodied thereon, the instructions to cause one or more processors, coupled with a cache store, to:
receive a first request that includes an identifier and a set of key-value pairs;
predict, using a machine learning model, a plurality of predicted requests indicative of one or more subsequent requests based on the identifier of the set of key-value pairs from the first request;
identify, using the machine learning model and based on a comparison with a threshold metric, a subset of predicted requests from the plurality of predicted requests, the subset of predicted requests comprising predicted request identifiers and corresponding predicted key-value pairs;
construct, using the machine learning model and based on the predicted request identifiers and the corresponding predicted key-value pairs, a set of labels comprising classifications for the subset of predicted requests;
retrieve, by the one or more processors using the set of labels and from a database, data for the subset of predicted requests;
configure, in the cache store, the set of labels as cache keys and the data retrieved for the subset of predicted requests as cache values; and
transmit, responsive to receipt of a subsequent request that matches one of the subset of predicted requests, a cache value from the cache store that corresponds to the subsequent request.

20. The non-transitory computer-readable medium of claim 19, comprising the instructions embodied there to cause the one or more processors to:
receive, via a client service, a second request;
predict, responsive to receiving the second request, using the machine learning model, a second plurality of requests based on the first request and the second request;
identify, using the machine learning model and based on a second comparison with the threshold metric, a second subset of predicted requests from the second plurality of requests; and
transmit, responsive to receipt of a second subsequent request that matches one of a group of predicted requests comprising the second subset of predicted requests and one or more of the subset of predicted requests that are below a cache store threshold, a second cache value from the cache store that corresponds to the second subsequent request.

* * * * *